US010197320B2

(12) United States Patent
Luo

(10) Patent No.: US 10,197,320 B2
(45) Date of Patent: Feb. 5, 2019

(54) METHOD AND APPARATUS FOR ADJUSTING OPERATING FREQUENCY OF INVERTER COMPRESSOR

(71) Applicants:GD MIDEA HEATING & VENTILATING EQUIPMENT CO., LTD., Foshan (CN); MIDEA GROUP CO., LTD., Foshan (CN)

(72) Inventor: Bin Luo, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 690 days.

(21) Appl. No.: 14/670,974

(22) Filed: Mar. 27, 2015

(65) Prior Publication Data

US 2015/0323235 A1 Nov. 12, 2015

(30) Foreign Application Priority Data

May 9, 2014 (CN) .......................... 2014 1 0196223
May 9, 2014 (CN) .......................... 2014 1 0196225
May 9, 2014 (CN) .......................... 2014 1 0196231
May 9, 2014 (CN) .......................... 2014 1 0196966

(51) Int. Cl.
F25B 49/02 (2006.01)

(52) U.S. Cl.
CPC .......... *F25B 49/025* (2013.01); *F25B 49/022* (2013.01); *F25B 2500/19* (2013.01); *F25B 2600/01* (2013.01); *F25B 2600/021* (2013.01); *F25B 2700/151* (2013.01); *F25B 2700/171* (2013.01); *Y02B 30/741* (2013.01)

(58) Field of Classification Search
CPC . F25B 2600/021; F25B 49/022; F25B 49/025
USPC ......................................................... 62/230
See application file for complete search history.

(56) References Cited

U.S. PATENT DOCUMENTS

| 3,686,554 | A | * | 8/1972 | Getz | H02P 7/2913 388/814 |
|---|---|---|---|---|---|
| 4,905,135 | A | * | 2/1990 | Unehara | H02M 7/53875 318/811 |
| 5,673,568 | A | * | 10/1997 | Isshiki | F24F 11/0009 62/157 |
| 6,505,476 | B1 | * | 1/2003 | Nishida | F25B 9/008 62/210 |
| 2002/0170305 | A1 | * | 11/2002 | Nakajima | F04D 27/0207 62/228.3 |

(Continued)

*Primary Examiner* — Henry Crenshaw
(74) *Attorney, Agent, or Firm* — Lathrop Gage LLP

(57) ABSTRACT

A method and an apparatus for adjusting an operating frequency of an inverter compressor are provided. The method includes following steps: detecting whether an inverter air conditioner is in a heating mode; obtaining a target operating current of the inverter compressor if the inverter air conditioner is in the heating mode; adjusting the operating frequency of the inverter compressor according to the target operating current; obtaining an operating parameter of the inverter compressor and obtaining a maximum operating frequency of the inverter compressor according to the operating parameter; obtaining a current correction according to the maximum operating frequency and correcting the target operating current according to the current correction to update the target operating current.

20 Claims, 10 Drawing Sheets

(56) References Cited

U.S. PATENT DOCUMENTS

| | | | |
|---|---|---|---|
| 2003/0041603 A1* | 3/2003 | Tada | B60H 1/3222 |
| | | | 62/134 |
| 2003/0217559 A1* | 11/2003 | Ieda | B60H 1/00428 |
| | | | 62/230 |
| 2006/0283198 A1* | 12/2006 | Song | F24F 11/0009 |
| | | | 62/228.1 |
| 2009/0007577 A1* | 1/2009 | Kotani | F25B 49/02 |
| | | | 62/177 |
| 2010/0058785 A1* | 3/2010 | Matsuno | F25B 49/005 |
| | | | 62/125 |
| 2013/0025301 A1* | 1/2013 | Maitani | F24D 11/0214 |
| | | | 62/79 |
| 2013/0088163 A1* | 4/2013 | Nam | G09G 3/342 |
| | | | 315/210 |

* cited by examiner

METHOD AND APPARATUS FOR ADJUSTING OPERATING FREQUENCY OF INVERTER COMPRESSOR

CROSS REFERENCE TO RELATED APPLICATION

This application claims priority to and benefits of Chinese Patent Applications No. 201410196223.X, No. 201410196966.7, No. 201410196225.9 and No. 201410196231.4, filed with State Intellectual Property Office on May 9, 2014, the entire contents of which are incorporated herein by reference.

FIELD

The present disclosure relates to a technology field of an air conditioner, and more particularly, to a method for adjusting an operating frequency of an inverter compressor, an apparatus for adjusting an operating frequency of an inverter compressor and an inverter air conditioner.

BACKGROUND

With the development of air-conditioning technology, inverter air conditioners have become more popular in the market, and a sales volume of the inverter air conditioners has also been enhanced rapidly. At present, the inverter air conditioners in the market require a complete set of installation, in which an indoor machine and an outdoor machine require a specialized and matched communication to realize a control for a compressor of the outdoor machine. Therefore, it is needed to ensure the synchronization and matching between the indoor machine and the outdoor machine.

The inverter air conditioner in the related art may be shown in FIG. 1. During operation, the outdoor machine receives a series of signals (such as an on-off signal, a temperature setting signal or an indoor temperature signal) sent from the indoor machine by a specific transmission rule or signals processed by the indoor machine, such that the compressor of the outdoor machine may be controlled to operate at a specific frequency and an operation frequency of the compressor may be adjusted according to indoor changes. In the related art, the indoor machine needs to send corresponding signals to the outdoor machine, so as to realize control on various components of the outdoor machine. In other words, in the case that the indoor machine and the outdoor machine do not communicate with each other, the outdoor machine cannot operate normally. Therefore, there is a need to improve the conventional inverter air conditioners.

SUMMARY

Embodiments of the present disclosure seek to solve at least one of the problems existing in the related art to at least some extent.

Accordingly, embodiments of a first aspect of the present disclosure provide a method for adjusting an operating frequency of an inverter compressor, including: detecting whether an inverter air conditioner including the inverter compressor is in a heating mode; obtaining a target operating current of the inverter compressor if the inverter air conditioner is in the heating mode; adjusting the operating frequency of the inverter compressor according to the target operating current; obtaining an operating parameter of the inverter compressor and obtaining a maximum operating frequency of the inverter compressor according to the operating parameter; obtaining a current correction according to the maximum operating frequency and correcting the target operating current according to the current correction to update the target operating current.

Embodiments of a second aspect of the present disclosure provide an apparatus for adjusting an operating frequency of an inverter compressor, including: a detecting module, configured to detect whether an inverter air conditioner is in a heating mode; a first obtaining module, configured to obtain a target operating current of the inverter compressor when the inverter air conditioner is in the heating mode; an adjusting module, configured to adjust the operating frequency of the inverter compressor according to the target operating current; a second obtaining module, configured to obtain an operating parameter of the inverter compressor and to obtain a maximum operating frequency of the inverter compressor according to the operating parameter; and an updating module, configured to obtain a current correction according to the maximum operating frequency and to correct the target operating current according to the current correction to update the target operating current.

Embodiments of a third aspect of the present disclosure provide an inverter air conditioner, including: a signal sending terminal, configured to send a controlling signal; an inverter compressor; a current detecting unit, connected with the inverter compressor and configured to detect a present current of the inverter compressor; an outdoor machine controlling unit, comprising an apparatus for adjusting an operating frequency of an inverter compressor according to claim 10 and a signal receiving terminal, wherein, the signal receiving terminal is configured to receive the controlling signal; the apparatus for adjusting an operating frequency of an inverter compressor is connected with the signal receiving terminal, the current detecting unit and the inverter compressor respectively, and is configured to adjust an operating frequency of an inverter compressor according to the controlling signal and the present current.

Embodiments of a fourth aspect of the present disclosure provide a non-transitory computer-readable storage medium having stored therein instructions that, when executed by a processor of an inverter air conditioner, causes the inverter air conditioner to perform a method for adjusting an operating frequency of an inverter compressor, and the method includes: detecting whether the inverter air conditioner is in a heating mode; obtaining a target operating current of the inverter compressor if the inverter air conditioner is in the heating mode; adjusting the operating frequency of the inverter compressor according to the target operating current; obtaining an operating parameter of the inverter compressor and obtaining a maximum operating frequency of the inverter compressor according to the operating parameter; obtaining a current correction according to the maximum operating frequency and correcting the target operating current according to the current correction to update the target operating current.

According to embodiments of the present disclosure, in the case that the indoor machine and the outdoor machine do not communicate with each other, the operating frequency of the inverter compressor may be adjusted automatically by self-learning, which cancels the transmission process of the controlling parameters and thus has a high reliability.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. In the specification, unless specified or limited otherwise, terms such as "first" and "second" are used herein for purposes of description and are not intended to indicate or imply relative importance or significance.

A method for adjusting an operating frequency of an inverter compressor, an apparatus for adjusting an operating frequency of an inverter compressor, and an inverter air conditioner including the apparatus for adjusting an operating frequency of an inverter compressor according to embodiments of the present disclosure will be described in the following with reference to drawings.

Figure 1:
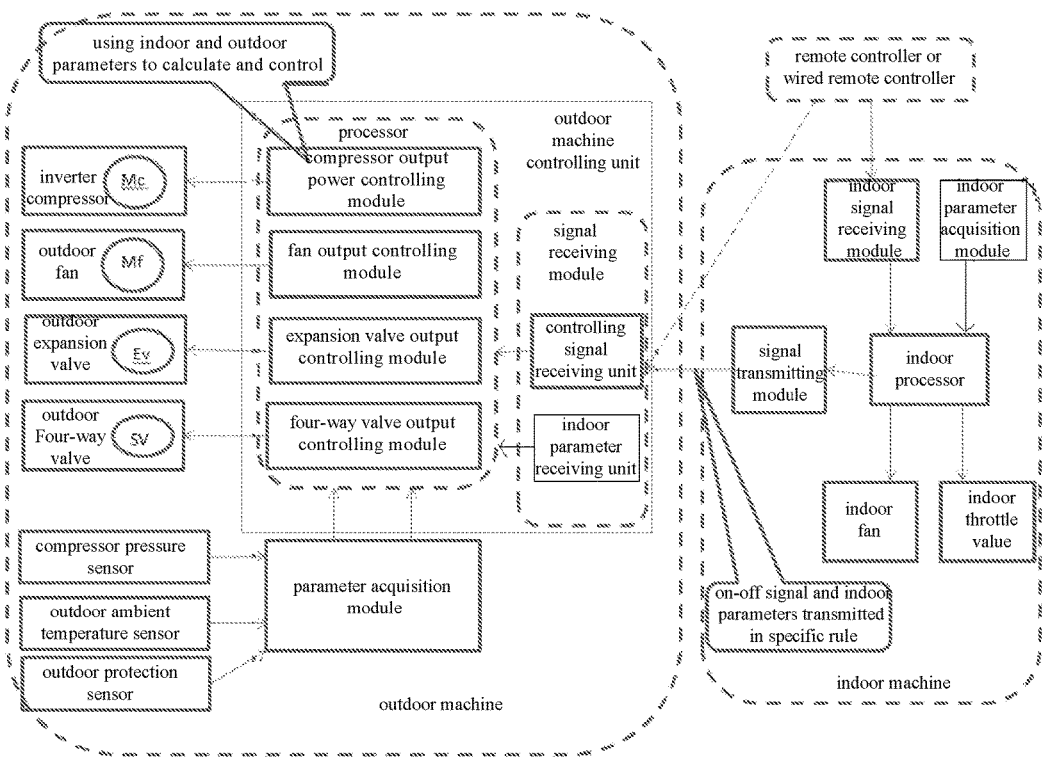
FIG. 1 is a block diagram illustrating an inverter air conditioner in the related art.
Figure 2:
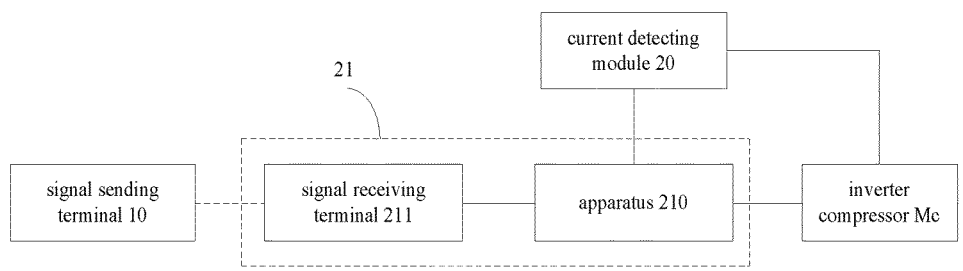
FIG. 2 is a block diagram illustrating an inverter air conditioner according to an embodiment of the present disclosure.

FIG. 2 is a block diagram illustrating an inverter air conditioner according to an embodiment of the present disclosure. As shown in FIG. 2, the inverter air conditioner according to an embodiment of the present disclosure includes a signal sending terminal 10, an inverter compressor Mc, a current detecting module 20 and an outdoor machine controlling unit 21. The signal sending terminal 10 is configured to send a controlling signal. The current detecting module 20 is connected with the inverter compressor Mc and is configured to detect a present current of the inverter compressor Mc. The outdoor machine controlling unit 21 includes an apparatus 210 for adjusting an operating frequency of an inverter compressor and a signal receiving terminal 211, in which the signal receiving terminal 211 is configured to receive the controlling signal, the apparatus 210 for adjusting an operating frequency of an inverter compressor is connected with the signal receiving terminal 211, the current detecting module 20 and the inverter compressor Mc respectively, and the apparatus 210 for adjusting an operating frequency of an inverter compressor is configured to adjust the operating frequency of the inverter compressor Mc according to the controlling signal and the present current.

Further, in an embodiment of the present disclosure, the inverter air conditioner further includes an indoor machine controlling unit 30. The indoor machine controlling unit 30 is configured to receive the controlling signal and to send the controlling signal to the signal receiving terminal 211.

Figure 3:
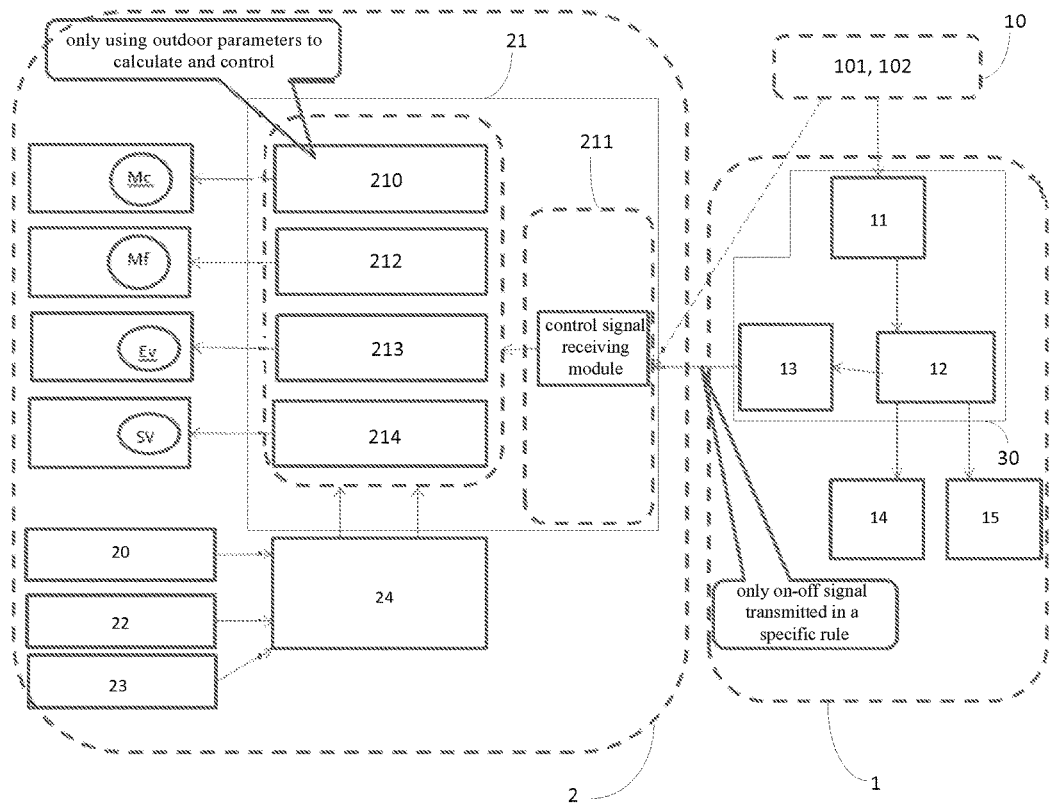
FIG. 3 is a block diagram illustrating an inverter air conditioner according to a specific embodiment of the present disclosure.

Further, FIG. 3 is a block diagram illustrating an inverter air conditioner according to a specific embodiment of the present disclosure. As shown in FIG. 3, the inverter air conditioner includes an indoor machine 1 and an outdoor machine 2. The outdoor machine includes the inverter compressor Mc, the current detecting unit 20 and the outdoor machine controlling unit 21. The current detecting unit 20 may be a current sensor, and the current sensor may be mounted on a circuit board of the outdoor machine controlling unit 21. The signal sending terminal 10 may be a remote controller 101, a wired remote controller 102 or the like, and the controlling signal sent by the signal sending terminal 10 may be an on-off signal and a mode selecting signal. The apparatus 210 in the outdoor machine controlling unit 21 may adjust the operation frequency of the inverter compressor Mc according to the mode selecting signal and the present current of the inverter compressor Mc. Specifically, as shown in FIG. 3, the signal receiving terminal 211 may be a signal receiving module, and may be used as the only means for receiving the on-off signal and the mode selecting signal sent directly from the remote controller 101 or the wired remote controller 102, or receiving the on-off signal and the mode selecting signal sent from the indoor machine 1.

In addition, as shown in FIG. 3, the outdoor machine 2 further includes an outdoor fan Mf, an outdoor expansion valve Ev, an outdoor four-way valve SV, an outdoor ambient temperature sensor 22, an outdoor protection sensor 23 and a parameter acquisition module 24. The outdoor ambient temperature sensor 22 is configured to detect a current ambient temperature of the outdoor machine 2. The parameter acquisition module 24 is connected between each sensor and the outdoor machine controlling unit 21, and is configured to process parameters obtained by the current detecting unit 20, the outdoor ambient temperature sensor 22 and the outdoor protection sensor 23 and to send processed parameters to the outdoor machine controlling unit 21. Specifically, in an embodiment of the present disclosure, the outdoor machine controlling unit 21 further includes a fan controlling module 212, an outdoor expansion valve controlling module 213 and an outdoor four-way valve controlling module 214. The apparatus 210, the fan controlling module 212, the outdoor expansion valve controlling module 213 and the outdoor four-way valve controlling module 214 are connected with the inverter compressor Mc, the outdoor fan Mf, the outdoor expansion valve Ev and the outdoor four-way valve SV respectively, and correspondingly control the inverter compressor Mc, the outdoor fan Mf, the outdoor expansion valve Ev and the outdoor four-way valve SV according to a acquisition signal output from the acquisition module 24 and the controlling signal received by the signal receiving terminal 211.

As shown in FIG. 3, the indoor machine 1 includes an indoor machine controlling unit 30, an indoor fan 14 and an indoor throttle valve 15 and other electrical components. The indoor machine controlling unit 30 includes an indoor signal receiving module 11, an indoor processing module 12 and a signal transmitting module 13. The indoor fan 14, the indoor throttle valve 15 and the indoor signal receiving module 11 are connected with the indoor processing module 12, and the indoor fan 14 and the indoor throttle valve 15 are controlled by the indoor processing module 12. The signal transmitting module 13 is connected with the signal receiving terminal 211, and the indoor machine 1 sends the on-off signal and the mode selecting signal to the signal receiving module of the signal receiving terminal 211 through the signal transmitting module 13 according to a general transmission rule. The on-off signal and the mode selecting signal may be directly sent to the signal receiving terminal 211 in the outdoor machine 2 by the remote controller 101 or the wired remote controller 102. Alternatively, the indoor machine 1 may receive the on-off signal and the mode selecting signal sent from the remote controller 101 or the wired remote controller 102 through the indoor signal receiving module 11, and then the indoor machine 1 sends the on-off signal and the mode selecting signal to the signal receiving module in the signal receiving terminal 211 through the signal transmitting module 13 according to the general transmission rule.

According to an embodiment of the present disclosure, a method for adjusting an operating frequency of an inverter compressor is provided, including: detecting whether a inverter air conditioner comprising the inverter compressor is in a heating mode; obtaining a target operating current of the inverter compressor if the inverter air conditioner is in the heating mode; adjusting the operating frequency of the inverter compressor according to the target operating current; obtaining an operating parameter of the inverter compressor and obtaining a maximum operating frequency of the inverter compressor according to the operating parameter; obtaining a current correction according to the maximum operating frequency and correcting the target operating current according to the current correction to update the target operating current.

According to another embodiment of the present disclosure, an apparatus for adjusting an operating frequency of an inverter compressor is provided, including: a detecting module, configured to detect whether an inverter air conditioner comprising the inverter compressor is in a heating mode; a first obtaining module, configured to obtain a target operating current of the inverter compressor when the inverter air conditioner is in the heating mode; an adjusting module, configured to adjust the operating frequency of the inverter compressor according to the target operating current; a second obtaining module, configured to obtain an operating parameter of the inverter compressor and to obtain a maximum operating frequency of the inverter compressor according to the operating parameter; an updating module, configured to obtain a current correction according to the maximum operating frequency and to correct the target operating current according to the current correction so as to update the target operating current.

According to embodiments of the present disclosure, the operating frequency of the inverter compressor may be adjusted automatically by self-learning in the case that the indoor machine and the outdoor machine do not communicate with each other, which cancels a transmission process of controlling parameters thus having a high reliability.

Specifically, in order to have a clearer understanding for the present disclosure, how to obtain the operating parameter of the inverter compressor and how to correct the target operating current according to the operating parameter will be described according to following embodiments. However, it should be noted that following embodiments are merely illustrative, and those skilled in the art may select other operating parameters or other control methods according to following embodiments, but these changes should be included within the scope of the present disclosure.

Embodiment 1

In an embodiment of the present disclosure, according to the on-off signal and the mode selecting signal, the inverter air conditioner may control the outdoor machine 2 to start or shut down, or to select an operating mode. When it is detected that the inverter air conditioner is in the heating mode, the apparatus 210 for adjusting an operating frequency of an inverter compressor obtains the target operating current $I_{AM0}$ to adjust the operating frequency of the inverter compressor Mc according to the target operating current $I_{AM0}$, and when a continuous operating period of the inverter compressor Mc is greater than or equal to a second preset period (T12, for example U minutes), and the current operating frequency of the inverter compressor Mc is greater than or equal to the operating frequency at which the inverter compressor Mc operates the first preset period (T11, for example U minutes) earlier, a maximum operating frequency Hzmax of the inverter compressor Mc in a third preset period (T13, for example X minutes) is obtained, and a current correction $\Delta I$ may be obtained according to the maximum operating frequency Hzmax. Further, the target operating current $I_{AM0}$ may be corrected according to the current correction $\Delta I$ so as to update the target operating current $I_{AM0}$, and finally the operating frequency of the inverter compressor Mc may be adjusted according to an updated target operating current $I_{AM0}$, thus realizing an automatic frequency control.

Specifically, when the inverter air conditioner is started for the first time, the apparatus 210 may set the target operating current $I_{AM0}$ of the inverter compressor Mc to be a preset current according to an ability of the outdoor machine 2. For example, for the outdoor machine 2 of a 3P air conditioner, the target operating current $I_{AM0}$ may be set to 10A, and for the outdoor machine 2 of a 4P air conditioner, the target operating current $I_{AM0}$ may be set to 13A. Further, in an embodiment of the present disclosure, when the inverter compressor is shut down, the apparatus 210 may use the updated target operating current $I_{AM0}$ as the target operating current $I_{AM0}$ of the inverter compressor 2 when the outdoor machine 2 is started next time. Further, in an embodiment of the present disclosure, when the inverter compressor is operating, the apparatus 210 may also obtain the target operating current $I_{AM0}$ according to the mode selecting signal.

Therefore, the inverter air conditioner according to embodiments of the present disclosure may adjust the operating frequency of the inverter compressor Mc intelligently and automatically according to the ability of the outdoor machine 2, the continuous operating period, the current operating frequency and the maximum operating frequency Hzmax of the inverter compressor Mc when it is in the heating mode without communication between the indoor machine and the outdoor machine, which makes the inverter compressor Mc to play its ability timely, thus ensuring that the temperature in the environment where the air conditioner is reaches a preset temperature quickly.

In an embodiment of the present disclosure, the inverter air conditioner may be a one-driven-one system or a one-driven-more system, and may be a cooling only air conditioner or a heat pump air conditioner. The indoor machine 1 does not send parameters such as the indoor temperature to the outdoor machine 2, and the outdoor machine 2 is controlled to start, shut down or change the operation mode only according to the on-off signal and the mode selecting signal sent by the remote controller 101, the wired remote controller 102 or the indoor machine 1. The inverter air conditioner according to embodiments of the present disclosure can control the inverter compressor Mc in the heating mode with no communication between the indoor machine 1 and the outdoor machine 2, and the outdoor machine controlling unit 21 of the outdoor machine 2 may realize a control for the electrical components of the outdoor machine 2 such as the inverter compressor Mc by self-learning, such that the indoor temperature may reach the preset temperature quickly and may be maintained at the preset temperature.

Further, in an embodiment of the present disclosure, when the outdoor machine controlling unit 21 receives the on-off signal, the outdoor machine controlling unit 21 delays the on-off signal for a certain period (for example S seconds), so as to prevent the outdoor machine 2 from starting due to misuses of users, and to avoid misjudgment of the outdoor machine controlling unit 21. In other words, after the outdoor machine controlling unit 21 receives the on-off signal, a certain period may be delayed and then the outdoor machine 2 may be started or shut down.

With the inverter air conditioner according to embodiments of the present disclosure, the signal receiving terminal in the outdoor machine controlling unit receives the controlling signal from the signal sending terminal, and then the apparatus for adjusting an operating frequency of an inverter compressor in the outdoor machine controlling unit may adjust the operating frequency of the inverter compressor according to the controlling signal and the present current detected by the current detecting unit when the inverter air conditioner is in the heating mode with no communication between the indoor machine and the outdoor machine. Independent of the indoor machine, the inverter air conditioner may automatically adjust the operating frequency of the inverter compressor by self-learning parameters of the inverter compressor, and during which, the indoor machine and the outdoor machine do not need specific communication to transmit the controlling parameters, so that the structure of the inverter air conditioners becomes easier, the cost is greatly reduced, and the reliability of the inverter air conditioners is improved.

A method for adjusting an operating frequency of an inverter compressor according to an embodiment of the present disclosure will be described with reference to drawings as follows.

Figure 4:
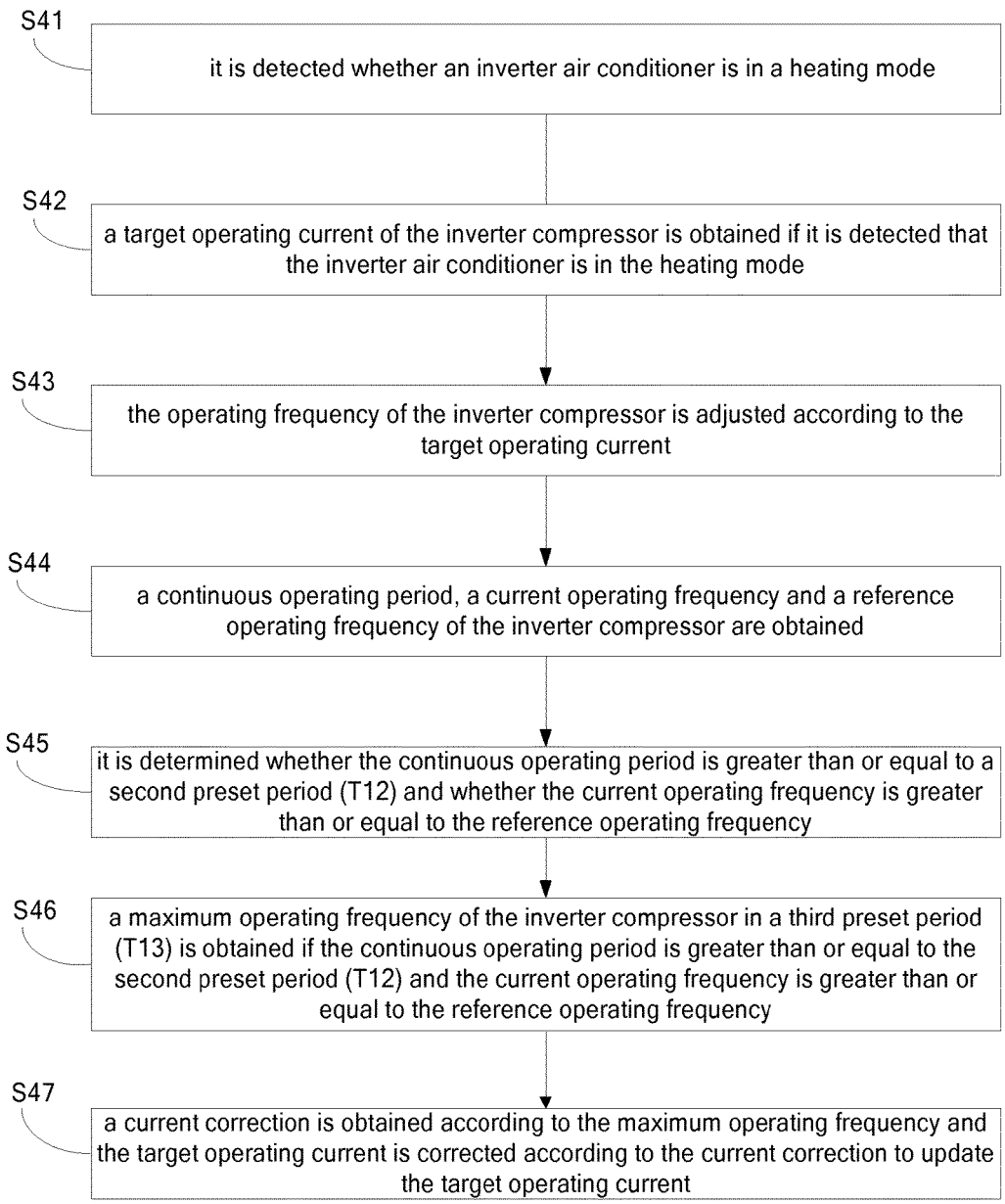
FIG. 4 is a flow chart showing a method for adjusting an operating frequency of an inverter compressor according to a first embodiment of the present disclosure.

FIG. 4 is a flow chart showing the method for adjusting an operating frequency of an inverter compressor according to an embodiment of the present disclosure. As shown in FIG. 4, the method for adjusting an operating frequency of an inverter compressor according to an embodiment of the present disclosure includes following steps:

At step S41, it is detected whether an inverter air conditioner is in a heating mode.

At step S42, a target operating current of the inverter compressor is obtained when the inverter air conditioner is in the heating mode.

When the inverter air conditioner is started for the first time, the target operating current of the inverter compressor may be set to a preset current according to an ability of the outdoor machine, for example, for the outdoor machine of a 3P air conditioner, the target operating current may be set to 10A, and for the outdoor machine of a 4P air conditioner, the target operating current may be set to 13A. Further, in an embodiment of the present disclosure, when the inverter compressor is operating, the target operating current may be obtained according to a mode selecting signal.

At step S43, the operating frequency of the inverter compressor is adjusted according to the target operating current.

Step S44 may be executed after the operating frequency of the inverter compressor is adjusted.

At step S44, a continuous operating period, a current operating frequency and a reference operating frequency of the inverter compressor are obtained. The reference operating frequency is the operating frequency at which the inverter compressor operates a first preset period (T11) earlier.

At step S45, it is determined whether the continuous operating period is greater than or equal to a second preset period (T12) and whether the current operating frequency is greater than or equal to the reference operating frequency.

At step S46, a maximum operating frequency of the inverter compressor in a third preset period (T13) is obtained if the continuous operating period is greater than or equal to the second preset period (T12) and the current operating frequency is greater than or equal to the reference operating frequency.

Step S47 may be executed after the maximum operating frequency of the inverter compressor in the third preset period (T13) is obtained. In addition, in another embodiment of the present disclosure, it is may be returned to step S41 if the continuous operating period is greater than or equal to the second preset period (T12) and if the current operating frequency is less than or equal to the reference operating frequency.

At step S47, a current correction is obtained according to the maximum operating frequency and the target operating current is corrected according to the current correction to update the target operating current.

In an embodiment of the present disclosure, the current correction is denoted by a formula of $$\Delta I = A \times \text{Hzmax}^2 + B \times \text{Hzmax} + C$$

where $\Delta I$ represents the current correction, Hzmax represents the maximum operating frequency, A, B and C represent preset constants respectively.

Further, in an embodiment of the present disclosure, the target operating current is updated by a formula of $$I_{AM0} = I_{AM0} - \Delta I,$$

where $I_{AM0}$ represent the target operating current. Since the current correction is a value which is greater than or equal to zero, an updated target operating current is greater than the target operating current before updating. It should be noted that, if the continuous operating period is greater than or equal to the second preset period (T12) and the current operating frequency is greater than or equal to the reference operating frequency, the target operating current is too small, and the inverter compressor cannot reach the preset temperature, and thus it is necessary to increase the target operating current of the inverter compressor.

Further, in an embodiment of the present disclosure, when the inverter compressor is shut down, the updated target operating current of the inverter compressor may be used as the target operating current of the inverter compressor in a next starting up.

Further, in an embodiment of the present disclosure, after step S47, step S48 is further executed.

At step S48, the continuous operating period is set to zero.

It should be noted that, in an embodiment of the present disclosure, step S41 to step S47 or step S41 to step S48 may be executed repeatedly. Thus, by setting the continuous operating period to zero, it is possible to ensure that the continuous operating period obtained in a next operation cycle is started from zero, so that the reliability of the method for adjusting an operating frequency of an inverter compressor according to an embodiment of the present disclosure may be ensured.

In summary, with the method for adjusting an operating frequency of an inverter compressor according to an embodiment of the present disclosure, when the inverter air conditioner is in the heating mode with no communication between the indoor machine and the outdoor machine, the inverter air conditioner may adjust the operating frequency of the inverter compressor intelligently and automatically according to the ability of the outdoor machine, the continuous operating period, the current operating frequency and the maximum operating frequency of the inverter compressor, which makes inverter compressor play its ability timely, thus ensuring that the temperature in the environment where the air conditioner is reaches the preset temperature quickly.

With the method for adjusting an operating frequency of an inverter compressor according to an embodiment of the present disclosure, when it is detected that the inverter air conditioner is in the heating mode, the operating frequency of the inverter compressor may be adjusted according to an obtained target operating current of the inverter compressor, and when it is determined that the continuous operating period is greater than or equal to a second preset period and the current operating frequency is greater than or equal to the operating frequency at which the inverter compressor operates the first preset period earlier, the current correction may be obtained, and the target operating current may be updated according to the current correction, thus realizing an automatic adjustment of the operating frequency of the inverter compressor. In the case that the indoor machine and the outdoor machine do not communicate with each other, the method for adjusting an operating frequency of an inverter compressor may automatically adjust the operating frequency of the inverter compressor by self-learning so as to enable the indoor temperature to reach and maintain the preset temperature, which cancels the transmission process of the controlling parameters, and has a high reliability.

An apparatus 210 for adjusting an operating frequency of an inverter compressor according to an embodiment of the present disclosure will be described with reference to drawings as follows.

Figure 5:
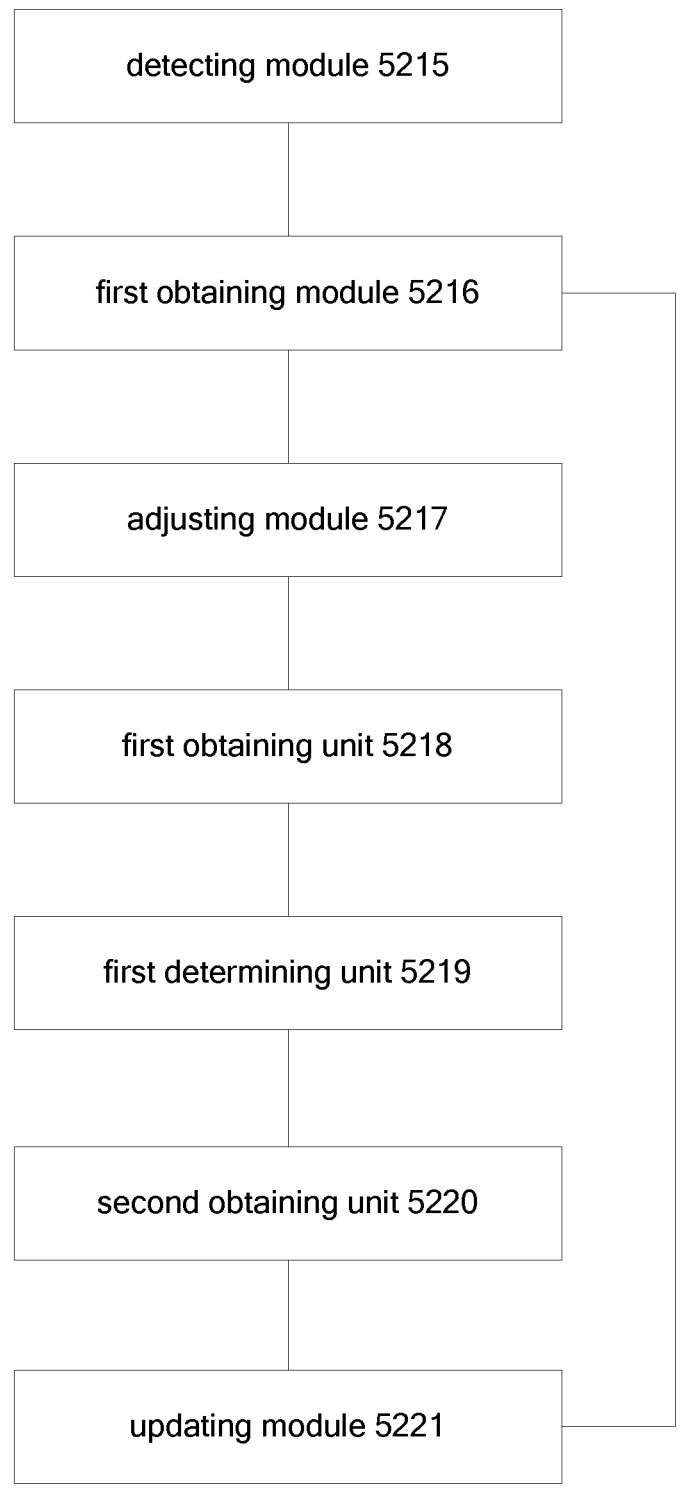
FIG. 5 is a block diagram illustrating an apparatus for adjusting an operating frequency of an inverter compressor according to a first embodiment of the present disclosure.

FIG. 5 is a block diagram illustrating the apparatus for adjusting an operating frequency of an inverter compressor according to an embodiment of the present disclosure. As shown in FIG. 5, the apparatus 210 for adjusting an operating frequency of an inverter compressor according to an embodiment includes a detecting module 5215, a first obtaining module 5216, an adjusting module 5217, a second obtaining module (not shown) and an updating module 5221. The second obtaining module further includes a first obtaining unit 5218, a first determining unit 5219 and a second obtaining unit 5220.

The detecting module 5215 is configured to detect whether an inverter air conditioner is in a heating mode. The first obtaining module 5216 is configured to obtain a target operating current $I_{AM0}$ of the inverter compressor Mc when the inverter air conditioner is in the heating mode. The adjusting module 5217 is configured to adjust the operating frequency of the inverter compressor Mc according to the target operating current $I_{AM0}$. The first obtaining unit 5218 is configured to obtain a continuous operating period, a current operating frequency and a reference operating frequency of the inverter compressor Mc, in which the reference operating frequency is the operating frequency at which the inverter compressor operates a first preset period (T11, for example W minutes) earlier. The first determining unit 5219 is configured to determine whether the continuous operating period is greater than or equal to a second preset period (T12, for example U minutes), and whether the current operating frequency is greater than or equal to the reference operating frequency. The second obtaining unit 5220 is configured to obtain a maximum operating frequency Hzmax of the inverter compressor Mc in a third preset period (T13, for example X minutes), if the continuous operating period is greater than or equal to the second preset period (T12) and the current operating frequency is greater than or equal to the reference operating frequency. The updating module 5221 is configured to obtain a current correction $\Delta I$ according to the maximum operating frequency Hzmax and to correct the target operating current $I_{AM0}$ according to the current correction $\Delta I$ so as to update the target operating current $I_{AM0}$.

Specifically, when the inverter air conditioner is started for the first time, the first obtaining module 5216 may set the target operating current $I_{AM0}$ of the inverter compressor Mc to a preset current according to an ability of the outdoor machine 2, for example, for the outdoor machine 2 of a 3P air conditioner, the target operating current may be set to 10A, and for the outdoor machine 2 of a 4P air conditioner, the target operating current may be set to 13A. Further, in an embodiment of the present disclosure, when the inverter compressor Mc is operating, the first obtaining module 5216 may obtain the target operating current $I_{AM0}$ according to a mode selecting signal.

In an embodiment of the present disclosure, the current correction is denoted by a formula of $$\Delta I = A \times \text{Hzmax}^2 + B \times \text{Hzmax} + C,$$

where $\Delta I$ represents the current correction, Hzmax represents the maximum operating frequency, A, B and C represent preset constants respectively.

Further, in an embodiment of the present disclosure, the target operating current is updated by the updating module 5221 according to a formula of $$I_{AM0} = I_{AM0} = \Delta I,$$

where $I_{AM0}$ represents the target operating current. Since the current correction $\Delta I$ is a value which is greater than or equal to zero, an updated target operating current $I_{AM0}$ is greater than the target operating current $I_{AM0}$ before updating. It should be noted that, if the continuous operating period is greater than or equal to the second preset period (T12) and the current operating frequency is greater than or equal to the operating frequency at which the inverter compressor operates the first preset period (T11) earlier, the target operating current $I_{AM0}$ of the inverter compressor Mc is too small and the inverter compressor Mc cannot reach the preset temperature, and thus it is necessary to increase the target operating current $I_{AM0}$ of the inverter compressor Mc.

Further, in an embodiment of the present disclosure, when the inverter compressor Mc is shut down, the updated target operating current $I_{AM0}$ may be used as the target operating current $I_{AM0}$ of the inverter compressor Mc in a next starting up.

Further, in an embodiment of the present disclosure, the apparatus 210 for adjusting an operating frequency of an inverter compressor further includes a setting module. The setting module is configured to set the continuous operating period to zero after the target operating current $I_{AM0}$ is updated by the updating module 5221. It should be noted that, in an embodiment of the present disclosure, the apparatus 210 for adjusting an operating frequency of an inverter compressor may operate repeatedly. Thus, by setting the continuous operating period to zero by the zero setting module, it is possible to ensure that the continuous operating period obtained by the first obtaining unit 5218 in a next operation cycle is started from zero, so that the reliability of the apparatus 210 for adjusting an operating frequency of an inverter compressor according to an embodiment of the present disclosure may be ensured.

Further, in another embodiment of the present disclosure, when the determining unit 5219 determines that the continuous operating period is greater than or equal to the second preset period (T12) and the current operating frequency is less than or equal to the operating frequency at which the inverter compressor operates the first preset period (T11) earlier, the second obtaining unit 5220 does not obtain the maximum target operating frequency Hzmax of the inverter compressor Mc in the third preset period, and thus the updating module 5221 does not update the target operating current $I_{AM0}$ either.

In summary, with the apparatus 210 for adjusting an operating frequency of an inverter compressor according to an embodiment of the present disclosure, when the inverter air conditioner is in the heating mode with no communication, the inverter air conditioner may adjust the operating frequency of the inverter compressor Mc intelligently and automatically according to the ability of the outdoor machine 2, the continuous operating period, the current operating frequency and the maximum operating frequency Hzmax of the inverter compressor, which makes the inverter compressor Mc play its ability timely, and thus the preset temperature may be reached quickly.

With the apparatus for adjusting an operating frequency of an inverter compressor according to an embodiment of the present disclosure, when it is detected by the detecting module that the inverter air conditioner is in the heating mode, the operating frequency of the inverter compressor may be adjusted by the adjusting module according to the target operating current of the inverter compressor obtained by the first obtaining module, and when it is determined by the determining module that the continuous operating period is greater than or equal to a second preset period and the current operating frequency is greater than or equal to the operating frequency at which the inverter compressor operates the first preset period earlier, the current correction may be obtained by the updating module and the target operating current may be updated by the updating module according to the current correction, and thus an automatic adjustment of the operating frequency of the inverter compressor may be realized. In the case that the indoor machine and the outdoor machine do not communicate with each other, the apparatus for adjusting an operating frequency of an inverter compressor may automatically adjust the operating frequency of the inverter compressor by self-learning such that the indoor temperature may reach and maintain the preset temperature, thus cancelling the transmission process of the controlling parameters, simplifying the structure of the inverter air conditioner, reducing the cost and improving the reliability of the inverter air conditioner.

Embodiment 2

In an embodiment of the present disclosure, according to the on-off signal and the mode selecting signal, the inverter air conditioner may control the outdoor machine 2 to start or shut down, or to select an operating mode. When it is detected that the inverter air conditioner is in the heating mode, the apparatus 210 for adjusting an operating frequency of an inverter compressor obtains the target operating current $I_{AM0}$ to adjust the operating frequency of the inverter compressor Mc according to the target operating current $I_{AM0}$, and when a continuous operating period of the inverter compressor Mc is greater than or equal to a fourth preset period (T21, for example E minutes) and the current operating frequency of the inverter compressor Mc is greater than or equal to the preset frequency (for example F Hz), a maximum operating frequency Hzmax of the inverter compressor Mc in a fifth preset period (T22, for example X minutes), is obtained, and a current correction ΔI may be obtained according to the maximum operating frequency Hzmax, further the target operating current $I_{AM0}$ may be corrected according to the current correction ΔI to update the target operating current $I_{AM0}$, and finally the operating frequency of the inverter compressor Mc may be adjusted according to an updated target operating current $I_{AM0}$, thus realizing an automatic frequency control.

Specifically, when the inverter air conditioner is started for the first time, the apparatus 210 for adjusting an operating frequency of an inverter compressor may set the target operating current $I_{AM0}$ of the inverter compressor Mc to a preset current according to an ability of the outdoor machine 2, for example, for the outdoor machine 2 of a 3P air conditioner, the target operating current $I_{AM0}$ may be set to 10A, and for the outdoor machine 2 of a 4P air conditioner, the target operating current $I_{AM0}$ may be set to 13A. Further, in an embodiment of the present disclosure, when the inverter compressor is shut down, the updated target operating current $I_{AM0}$ may be used as the target operating current $I_{AM0}$ of the outdoor machine 2 in a next starting up. Further, in an embodiment of the present disclosure, when the inverter compressor is operating, the apparatus 210 for adjusting an operating frequency of an inverter compressor may also obtain the target operating current $I_{AM0}$ according to the mode selecting signal.

Therefore, with the inverter air conditioner according to embodiments of the present disclosure, when the inverter air conditioner is in the heating mode with no communication between the indoor machine and the outdoor machine, the operating frequency of the inverter compressor Mc may be adjusted intelligently and automatically according to the ability of the outdoor machine 2, the continuous operating period, the current operating frequency and the maximum operating frequency Hzmax of the inverter compressor Mc, which makes the inverter compressor Mc to play its ability timely, thus enabling that the indoor temperature reaches a preset temperature quickly.

In an embodiment of the present disclosure, the inverter air conditioner may be a one-driven-one system or a one-driven-more system, and may be a cooling only air conditioner or a heat pump air conditioner. The indoor machine 1 can not send an indoor ambient temperature and other parameters to the outdoor machine 2, and the outdoor machine 2 is controlled to start or shut down or change operation mode only according to the on-off signal and the mode selecting signal sent by the remote controller 101, the wired remote controller 102 or the indoor machine 1. With the inverter air conditioner according to embodiments of the present disclosure, the inverter compressor Mc can controlled in the heating mode with no communication between the indoor machine 1 and the outdoor machine 2, and the outdoor machine controlling unit 21 of the outdoor machine 2 may realize a control for the inverter compressor Mc and other electrical components of the outdoor machine 2 by self-learning, so that the indoor temperature may reach and maintain the preset temperature.

Further, in an embodiment of the present disclosure, when the outdoor machine controlling unit 21 receives the on-off signal, the outdoor machine controlling unit 21 further delays the on-off signal for a certain period (for example S seconds), so as to prevent the outdoor machine 2 from starting due to misuses of users, and to avoid misjudgment of the outdoor machine controlling unit 21. In other words, after the outdoor machine controlling unit 21 receives the on-off signal, a certain period may be delayed and then the outdoor machine 2 may be started or shut down.

With the inverter air conditioner according to embodiments of the present disclosure, the signal receiving terminal in the outdoor machine controlling unit receives the controlling signal from the signal sending terminal, and then the apparatus for adjusting an operating frequency of an inverter compressor in the outdoor machine controlling unit may adjust the operating frequency of the inverter compressor according to the controlling signal and the current which is detected by the current detecting unit when the inverter air conditioner is in the heating mode with no communication between the indoor machine and the outdoor machine. By self-learning parameters of the inverter compressor, the inverter air conditioner may adjust the operating frequency of the inverter compressor automatically and independently of the indoor machine, such that the indoor ambient temperature may reach and maintain the preset temperature, and during the above process, the indoor machine and the outdoor machine do not need the specific communication to transmit the controlling parameters, and thus the structure of the inverter air conditioners becomes easier, the cost is greatly reduced, the transmission process of the controlling parameters is cancelled, and the reliability of the inverter air conditioners is improved.

A method for adjusting an operating frequency of an inverter compressor according to an embodiment of the present disclosure will be described with reference to drawings as follows.

Figure 6:
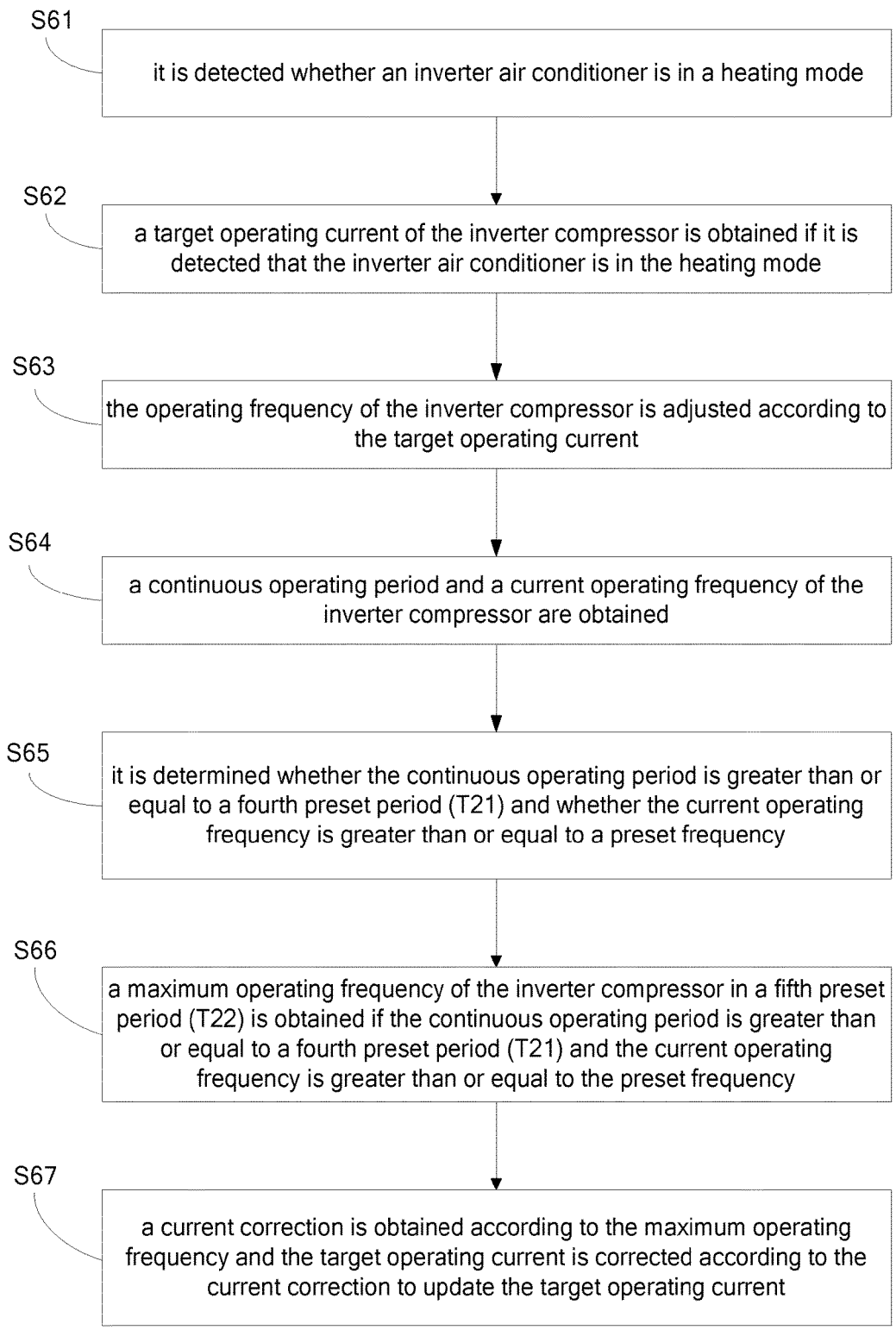
FIG. 6 is a flow chart showing a method for adjusting an operating frequency of an inverter compressor according to a second embodiment of the present disclosure.

FIG. 6 is a flow chart showing the method for adjusting an operating frequency of an inverter compressor according to an embodiment of the present disclosure. As shown in FIG. 6, the method for adjusting an operating frequency of an inverter compressor according to an embodiment of the present disclosure includes following steps:

At step S61, it is detected whether an inverter air conditioner is in a heating mode.

At step S62, a target operating current of the inverter compressor is obtained if it is detected that the inverter air conditioner is in the heating mode.

When the inverter air conditioner is started for the first time, the target operating current of the inverter compressor may be set to a preset current according to an ability of the outdoor machine, for example, for the outdoor machine of a 3P air conditioner, the target operating current may be set to 10A, and for the outdoor machine of a 4P air conditioner, the target operating current may be set to 13A. Further, in an embodiment of the present disclosure, when the inverter compressor is operating, the target operating current may be obtained according to a mode selecting signal.

At step S63, the operating frequency of the inverter compressor is adjusted according to the target operating current.

Step S64 may be executed after the operating frequency of the inverter compressor is adjusted.

At step S64, a continuous operating period and a current operating frequency of the inverter compressor are obtained.

At step S65, it is determined whether the continuous operating period is greater than or equal to a fourth preset period (T21) and whether the current operating frequency is greater than or equal to a preset frequency.

At step S66, a maximum operating frequency of the inverter compressor in a fifth preset period (T22) is obtained if the continuous operating period is greater than or equal to a fourth preset period (T21) and the current operating frequency is greater than or equal to a preset frequency.

At step S67, a current correction is obtained according to the maximum operating frequency and the target operating current is corrected according to the current correction to update the target operating current.

In an embodiment of the present disclosure, the current correction is obtained according to a formula of $$\Delta I = A \times Hzmax^2 + B \times Hzmax + C$$

where $\Delta I$ represents the current correction, Hzmax represents the maximum operating frequency, A, B and C represent preset constants respectively.

Further, in an embodiment of the present disclosure, the target operating current is updated according to formula of $$I_{AM0} = I_{AM0} - \Delta I,$$

where $I_{AM0}$ represents the target operating current. Since the current correction is a value which is greater than or equal to zero, an updated target operating current is greater than the target operating current before updating. It should be noted that, if the continuous operating period is greater than or equal to the fourth preset period (T21) and the current operating frequency is greater than or equal to the preset frequency, the target operating current is too small, and the inverter compressor cannot reach the preset temperature, and thus it is necessary to increase the target operating current of the inverter compressor.

Further, in an embodiment of the present disclosure, when the inverter compressor is shut down, the updated target operating current of the inverter compressor may be used as the target operating current of the inverter compressor in a next starting up.

Further, in an embodiment of the present disclosure, after step S67, step S68 may be further executed.

At step S68, the continuous operating period of the inverter compressor is set to zero.

It should be noted that, in an embodiment of the present disclosure, step S61 to step S67 or step S61 to step S68 may be executed repeatedly. Thus, by setting the continuous operating period to zero, it is possible to ensure that the continuous operating period obtained in a next operation cycle is started from zero, so that the reliability of the method for adjusting an operating frequency of an inverter compressor according to an embodiment of the present disclosure may be ensured.

In summary, with the method for adjusting an operating frequency of an inverter compressor according to an embodiment of the present disclosure, if the inverter air conditioner is in the heating mode with no communication between the indoor machine and the outdoor machine, the inverter air conditioner may adjust the operating frequency of the inverter compressor intelligently and automatically according to the ability of the outdoor machine, the continuous operating period, the current operating frequency and the maximum operating frequency of the inverter compressor, which makes the inverter compressor play its ability timely, thus ensuring that the indoor ambient temperature reaches the preset temperature quickly.

With the method for adjusting an operating frequency of an inverter compressor according to an embodiment of the present disclosure, when it is detected that the inverter air conditioner is in the heating mode, the operating frequency of the inverter compressor may be adjusted according to an obtained target operating current of the inverter compressor, and when it is determined that the continuous operating period is greater than or equal to a fourth preset period and the current operating frequency is greater than or equal to the preset frequency, the current correction may be obtained, and the target operating current may be updated according to the current correction, thus realizing an automatic adjustment of the operating frequency of the inverter compressor. In the case that the indoor machine and the outdoor machine do not communicate with each other, the method for adjusting an operating frequency of an inverter compressor may automatically adjust the operating frequency of the inverter compressor by self-learning to enable the indoor machine to reach and maintain the preset temperature, so that the transmission process of the controlling parameters is cancelled, and a high reliability is realized.

An apparatus 210 for adjusting an operating frequency of an inverter compressor according to an embodiment of the present disclosure will be described with reference to drawings as follows.

Figure 7:
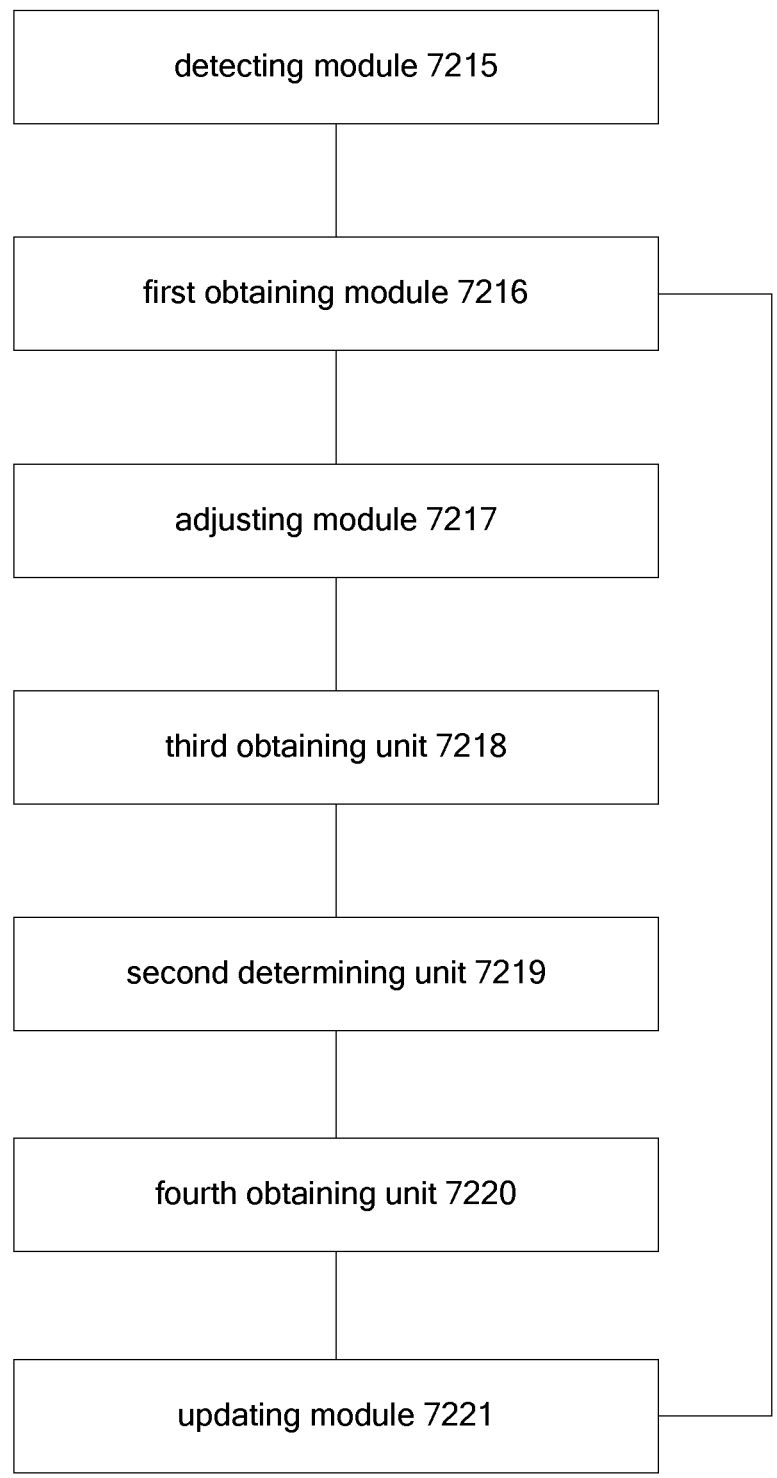
FIG. 7 is a block diagram illustrating an apparatus for adjusting an operating frequency of an inverter compressor according to a second embodiment of the present disclosure.

FIG. 7 is a block diagram illustrating the apparatus for adjusting an operating frequency of an inverter compressor according to an embodiment of the present disclosure. As shown in FIG. 7, the apparatus 210 for adjusting an operating frequency of an inverter compressor according to an embodiment of the present disclosure includes a detecting module 7215, a first obtaining module 7216, an adjusting module 7217, a second obtaining module (not shown) and an updating module 7221. The second obtaining module further includes a third obtaining unit 7218, a second determining unit 7219 and a fourth obtaining unit 7220.

The detecting module 7215 is configured to detect whether an inverter air conditioner is in a heating mode. The first obtaining module 7216 is configured to obtain a target operating current $I_{AM0}$ of the inverter compressor Mc when the inverter air conditioner is in the heating mode. The adjusting module 7217 is configured to adjust the operating frequency of the inverter compressor Mc according to the target operating current $I_{AM0}$. The third obtaining unit 7218 is configured to obtain a continuous operating period and a current operating frequency of the inverter compressor Mc. The second determining unit 7219 is configured to determine whether the continuous operating period is greater than or equal to a fourth preset period (T21, for example E minutes) and whether the current operating frequency is greater than or equal to a preset frequency (for example F Hz). The fourth obtaining unit 7220 is configured to obtain a maximum operating frequency Hzmax of the inverter compressor Mc in a fifth preset period (T22, for example X minutes), if the continuous operating period is greater than or equal to the fourth preset period (T21) and the current operating frequency is greater than or equal to the preset frequency. The updating module 7221 is configured to obtain a current correction ΔI according to the maximum operating frequency Hzmax and to correct the target operating current $I_{AM0}$ according to the current correction ΔI to update the target operating current $I_{AM0}$.

Specifically, when the inverter air conditioner is started for the first time, the first obtaining module 7216 may set the target operating current $I_{AM0}$ of the inverter compressor Mc to a preset current according to an ability of the outdoor machine 2, for example, for the outdoor machine 2 of a 3P air conditioner, the target operating current may be set to 10A, and for the outdoor machine 2 of a 4P air conditioner, the target operating current may be set to 13A. Further, in an embodiment of the present disclosure, when the inverter compressor Mc is operating, the first obtaining module 7216 may also obtain the target operating current $I_{AM0}$ according to a mode selecting signal.

In an embodiment of the present disclosure, the current correction is obtained according to a formula of $$\Delta I = A \times \text{Hzmax}^2 + B \times \text{Hzmax} + C,$$

where ΔI represents the current correction, Hzmax represents the maximum operating frequency, A, B and C represent preset constants respectively.

Further, in an embodiment of the present disclosure, the target operating current is updated by the updating module 7221 according to a formula of $$I_{AM0} = I_{AM0} - \Delta I,$$

where $I_{AM0}$ represents the target operating current. Since the current correction ΔI is a value which is greater than or equal to zero, an updated target operating current $I_{AM0}$ is greater than the target operating current $I_{AM0}$ before updating. It should be noted that, if the continuous operating period is greater than or equal to the fourth preset period (T21) and the current operating frequency is greater than or equal to the preset frequency, the target operating current $I_{AM0}$ of the inverter compressor Mc is too small, and the inverter compressor Mc cannot reach the preset temperature, and thus it is necessary to increase the target operating current $I_{AM0}$ of the inverter compressor Mc.

Further, in an embodiment of the present disclosure, when the inverter compressor Mc is shut down, the updated target operating current $I_{AM0}$ may be used as the target operating current $I_{AM0}$ of the inverter compressor Mc in a next starting up.

Further, in an embodiment of the present disclosure, the apparatus 210 for adjusting an operating frequency of an inverter compressor further includes a setting module. The setting module is configured to set the continuous operating period to zero after the target operating current $I_{AM0}$ is updated by the updating module 7221. It should be noted that, in an embodiment of the present disclosure, the apparatus 210 for adjusting an operating frequency of an inverter compressor may operate repeatedly. Thus, by setting the continuous operating period to zero through the setting module, it may ensure that the continuous operating period obtained in a next operation cycle of the apparatus 210 for adjusting an operating frequency of an inverter compressor is started from zero, so that the reliability of the apparatus 210 for adjusting an operating frequency of an inverter compressor according to an embodiment of the present disclosure may be ensured.

In summary, with the apparatus 210 for adjusting an operating frequency of an inverter compressor according to an embodiment of the present disclosure, if the inverter air conditioner is in the heating mode with no communication between the indoor machine and the outdoor machine, the operating frequency of the inverter compressor Mc may be adjusted intelligently and automatically according to the ability of the outdoor machine 2, the continuous operating period, the current operating frequency and the maximum operating frequency Hzmax of the inverter compressor, which makes the inverter compressor play its ability timely, thus ensuring that the indoor ambient temperature reaches the preset temperature quickly.

With the apparatus for adjusting an operating frequency of an inverter compressor according to an embodiment of the present disclosure, when it is detected that the inverter air conditioner is in the heating mode by the detecting module, the operating frequency of the inverter compressor may be adjusted by the adjusting module according to the target operating current of the inverter compressor obtained by the first obtaining module, and when it is determined by the determining module that the continuous operating period is greater than or equal to the fourth preset period and the current operating frequency is greater than or equal to the preset frequency, the current correction may be obtained by the updating module and the target operating current may be updated by the updating module according to the current correction, and thus an automatic adjustment of the operating frequency of the inverter compressor may be realized. In the case that the indoor machine and the outdoor machine do not communicate with each other, the apparatus for adjusting an operating frequency of an inverter compressor may automatically adjust the operating frequency of the inverter compressor by self-learning to enable the indoor ambient temperature to reach and maintain the preset temperature, so that the transmission process of the controlling parameters is cancelled, the structure of the inverter air conditioners is simplified, the cost is greatly reduced and the reliability of the inverter air conditioners is improved.

Embodiment 3

In an embodiment of the present disclosure, according to the on-off signal and the mode selecting signal, the outdoor machine 2 may be controlled to start or shut down, or to select an operating mode. When it is detected that the inverter air conditioner is in the heating mode, the apparatus 210 for adjusting an operating frequency of an inverter compressor obtains the target operating current $I_{AM0}$ to adjust the operating frequency of the inverter compressor Mc according to the target operating current $I_{AM0}$, and when a number of effective shut-downs of the inverter compressor Mc in a sixth preset period (T31) is greater than or equal to a first preset number, a maximum operating frequency Hzmax of the inverter compressor Mc in the sixth preset period (T31) is obtained, and a current correction $\Delta I$ may be obtained according to the maximum operating frequency Hzmax, further the target operating current $I_{AM0}$ may be corrected according to the current correction $\Delta I$ to update the target operating current $I_{AM0}$, and finally the operating frequency of the inverter compressor Mc may be adjusted according to an updated target operating current $I_{AM0}$, thus realizing an automatic frequency control.

Specifically, when the inverter air conditioner is started for the first time, the apparatus 210 for adjusting an operating frequency of an inverter compressor may set the target operating current $I_{AM0}$ of the inverter compressor Mc to a preset current according to an ability of the outdoor machine 2, for example, for the outdoor machine 2 of a 3P air conditioner, the target operating current $I_{AM0}$ may be set to 10A, and for the outdoor machine 2 of a 4P air conditioner, the target operating current $I_{AM0}$ may be set to 13A. Further, in an embodiment of the present disclosure, when the inverter compressor is shut down, the updated target operating current $I_{AM0}$ may be used as the target operating current $I_{AM0}$ of the outdoor machine 2 in a next starting up. Further, in an embodiment of the present disclosure, when the inverter compressor is operating, the apparatus 210 for adjusting an operating frequency of an inverter compressor may also obtain the target operating current $I_{AM0}$ according to the mode selecting signal.

Therefore, with the inverter air conditioner according to embodiments of the present disclosure, the operating frequency of the inverter compressor Mc may be adjusted intelligently and automatically according to the ability of the outdoor machine 2, the number of effective shut-downs of the inverter compressor Mc and the maximum operating frequency Hzmax of the inverter compressor, which makes the inverter compressor play its ability timely, thus ensuring that the indoor ambient temperature reaches the preset temperature quickly.

In an embodiment of the present disclosure, the inverter air conditioner may be a one-driven-one system or a one-driven-more system, and may be a cooling only air conditioner or a heat pump air conditioner. The indoor machine 1 cannot send an indoor ambient temperature and other parameters to the outdoor machine 2, and the outdoor machine 2 is controlled to start or shut down or change operation mode only according to the on-off signal and the mode selecting signal which are sent by the remote controller 101, the wired remote controller 102 or the indoor machine 1. The inverter air conditioner according to embodiments of the present disclosure can control the inverter compressor Mc in the heating mode with no communication between the indoor machine 1 and the outdoor machine 2, and the outdoor machine controlling unit 21 of the outdoor machine 2 may realize a control for the inverter compressor Mc and other electrical components of the outdoor machine 2 by self-learning, so that the indoor temperature may reach and maintain the preset temperature.

Further, in an embodiment of the present disclosure, when the outdoor machine controlling unit 21 receives the on-off signal, the outdoor machine controlling unit 21 further delays the on-off signal for a certain period (for example S seconds), so as to prevent the outdoor machine 2 from starting due to misuses of users, and to avoid misjudgment of the outdoor machine controlling unit 21. In other words, after the outdoor machine controlling unit 21 receives the on-off signal, a certain period may be delayed and then the outdoor machine 2 may be started or shut down.

With the inverter air conditioner according to embodiments of the present disclosure, the signal receiving terminal in the outdoor machine controlling unit receives the controlling signal from the signal sending terminal, and then the apparatus for adjusting an operating frequency of an inverter compressor in the outdoor machine controlling unit may adjust the operating frequency of the inverter compressor according to the controlling signal and the current which is detected by the current detecting unit, when the inverter air conditioner is in the heating mode with no communication between the indoor machine and the outdoor machine. By self-learning parameters of the inverter compressor, the operating frequency of the inverter compressor may be controlled automatically and independently of the indoor machine, and thus the indoor ambient temperature may reach and maintain the preset temperature. During the above process, the indoor machine and the outdoor machine do not need the specific communication to transmit the controlling parameters, so that the structure of the inverter air conditioner becomes easier, the cost is greatly reduced, the transmission process of the controlling parameters is cancelled, and the reliability of the inverter air conditioner is improved.

A method for adjusting an operating frequency of an inverter compressor according to an embodiment of the present disclosure will be described with reference to drawings as follows.

Figure 8:
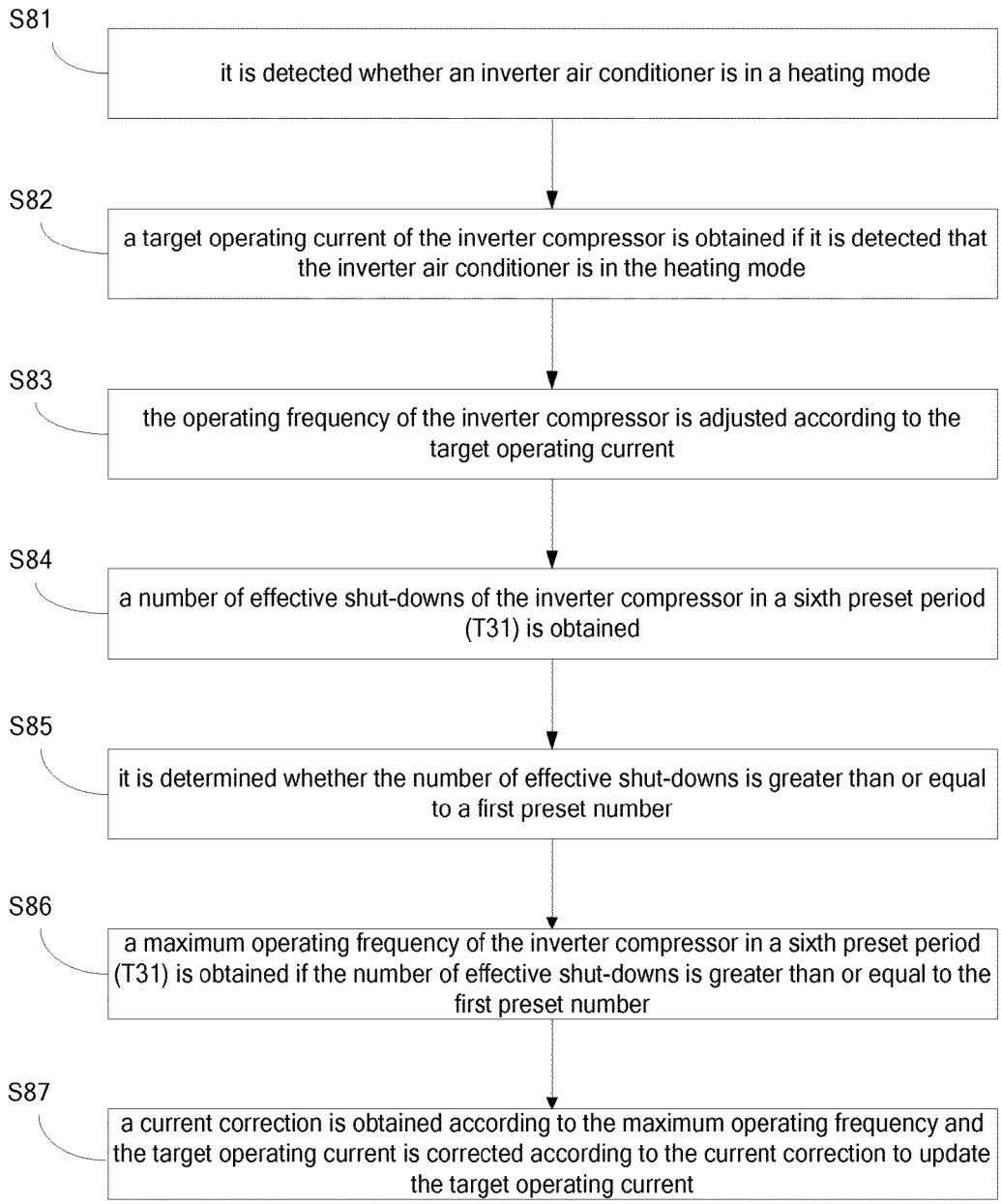
FIG. 8 is a flow chart showing a method for adjusting an operating frequency of an inverter compressor according to a third embodiment of the present disclosure.

FIG. 8 is a flow chart showing the method for adjusting an operating frequency of an inverter compressor according to an embodiment of the present disclosure. As shown in FIG. 8, the method for adjusting an operating frequency of an inverter compressor according to an embodiment of the present disclosure includes following steps.

At step S81, it is detected whether an inverter air conditioner is in a heating mode.

At step S82, a target operating current of the inverter compressor is obtained if it is detected that the inverter air conditioner is in the heating mode.

When the inverter air conditioner is started for the first time, the target operating current of the inverter compressor may be set to a preset current according to an ability of the outdoor machine, for example, for the outdoor machine of a 3P air conditioner, the target operating current may be set to 10A, and for the outdoor machine of a 4P air conditioner, the target operating current may be set to 13A. Further, in an embodiment of the present disclosure, when the inverter compressor is operating, the target operating current may also be obtained according to a mode selecting signal.

At step S83, the operating frequency of the inverter compressor is adjusted according to the target operating current.

Step S84 may be executed after the operating frequency of the inverter compressor is adjusted.

At step S84, a number of effective shut-downs of the inverter compressor is obtained.

In an embodiment of the present disclosure, the effective shut-down is a shut-down occurring when the continuous operating period is greater than or equal to a tenth preset period (T44).

At step S85, it is determined whether the number of effective shut-downs is greater than or equal to a first preset number.

At step S86, a maximum operating frequency of the inverter compressor in a sixth preset period (T31) is obtained if the number of effective shut-downs is greater than or equal to the first preset number.

After the maximum operating frequency of the inverter compressor in the sixth preset period (T31) is obtained, step S87 is executed.

At step S87, a current correction is obtained according to the maximum operating frequency and the target operating current is corrected according to the current correction to update the target operating current.

In an embodiment of the present disclosure, the current correction is obtained according to a formula of $$\Delta I = A \times Hzmax^2 + B \times Hzmax + C,$$

where $\Delta I$ represents the current correction, Hzmax represents the maximum operating frequency, A, B and C represent preset constants respectively.

Further, in an embodiment of the present disclosure, the target operating current is updated according to a formula of $$I_{AM0} = I_{AM0} - \Delta I,$$

where $I_{AM0}$ represents the target operating current. Since the current correction is a value which is greater than or equal to zero, an updated target operating current is greater than the target operating current before updating. It should be noted that, if the number of effective shut-downs is greater than or equal to the first preset number, the target operating current is too large, and it is necessary to decrease the target operating current of the inverter compressor so to take full advantage of the ability of the inverter compressor.

Further, in an embodiment of the present disclosure, when the inverter compressor is shut down, the updated target operating current of the inverter compressor may be used as the target operating current of the inverter compressor in a next starting up.

In summary, with the method for adjusting an operating frequency of an inverter compressor according to an embodiment of the present disclosure, if the inverter air conditioner is in the heating mode with no communication between the indoor machine and the outdoor machine, the operating frequency of the inverter compressor may be adjusted intelligently and automatically according to the ability of the outdoor machine, the number of effective shut-downs and the maximum operating frequency of the inverter compressor, which makes the inverter compressor play its ability timely, thus ensuring that the indoor ambient temperature reaches the preset temperature quickly.

With the method for adjusting an operating frequency of an inverter compressor according to an embodiment of the present disclosure, when it is detected that the inverter air conditioner is in the heating mode, the operating frequency of the inverter compressor may be adjusted according to an obtained target operating current of the inverter compressor, and when it is judged that the number of effective shut-downs in the sixth preset period (T31) is greater than or equal to the first preset number, the current correction may be obtained according to an obtained the maximum operating frequency, and the target operating current may be updated according to the current correction, and thus an automatic adjustment of the operating frequency of the inverter compressor may be realized. In the case that the indoor machine and the outdoor machine do not communicate with each other, the method for adjusting an operating frequency of an inverter compressor may automatically adjust the operating frequency of the inverter compressor by self-learning to enable the indoor ambient temperature to reach and maintain the preset temperature, such that the transmission process of the controlling parameters is cancelled, and a high reliability is obtained.

An apparatus 210 for adjusting an operating frequency of an inverter compressor according to an embodiment of the present disclosure will be described with reference to drawings as follows.

Figure 9:
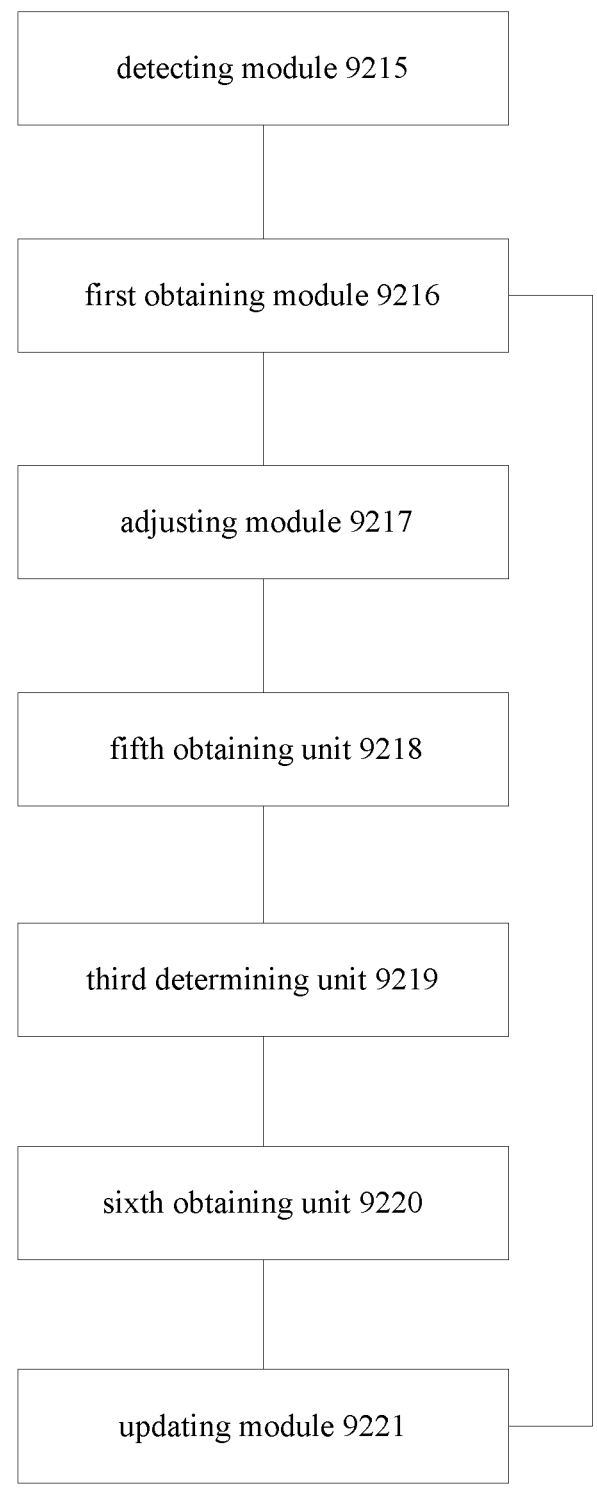
FIG. 9 is a block diagram illustrating an apparatus for adjusting an operating frequency of an inverter compressor according to a third embodiment of the present disclosure.

FIG. 9 is a block diagram illustrating the apparatus for adjusting an operating frequency of an inverter compressor according to an embodiment of the present disclosure. As shown in FIG. 9, the apparatus 210 for adjusting an operating frequency of an inverter compressor according to an embodiment of the present disclosure includes a detecting module 9215, a first obtaining module 9216, an adjusting module 9217, a second obtaining module (not shown) and an updating module 9221. The second obtaining module further includes a fifth obtaining unit 9218, a third determining unit 9219 and a sixth obtaining unit 9220.

The detecting module 9215 is configured to detect whether an inverter air conditioner is in a heating mode. The first obtaining module 9216 is configured to obtain a target operating current $I_{AM0}$ of the inverter compressor Mc if the inverter air conditioner is in the heating mode. The adjusting module 9217 is configured to adjust the operating frequency of the inverter compressor Mc according to the target operating current $I_{AM0}$. The fifth obtaining unit 9218 is configured to obtain a number of effective shut-downs in a sixth preset time (T31, for example X minutes). The third determining unit 9219 is configured to determine whether the number of effective shut-downs is greater than or equal to a first preset number. The sixth obtaining unit 9220 is configured to obtain a maximum operating frequency Hzmax of the inverter compressor Mc in the sixth preset time (T31) if the number of effective shut-downs is greater than or equal to the first preset number. The updating module 9221 is configured to obtain a current correction ΔI according to the maximum operating frequency Hzmax and to correct the target operating current $I_{AM0}$ according to the current correction ΔI to update the target operating current $I_{AM0}$.

Specifically, when the inverter air conditioner is started for the first time, the first obtaining module 9216 may set the target operating current $I_{AM0}$ of the inverter compressor Mc to a preset current according to an ability of the outdoor machine 2, for example, for the outdoor machine 2 of a 3P air conditioner, the target operating current may be set to 10A, and for the outdoor machine 2 of a 4P air conditioner, the target operating current may be set to 13A. Further, in an embodiment of the present disclosure, when the inverter compressor Mc is operating, the first obtaining module 9216 may also obtain the target operating current $I_{AM0}$ according to a mode selecting signal.

It should be noted that, the effective shut-down is a shut-down occurring when the continuous operating period is greater than or equal to a tenth preset period (T44).

Further, in an embodiment of the present disclosure, the current correction is obtained according to a formula of $$\Delta I = A \times Hzmax^2 + B \times Hzmax + C,$$

where ΔI represents the current correction, Hzmax represents the maximum operating frequency, A, B and C represent preset constants respectively.

Further, in an embodiment of the present disclosure, the target operating current is updated by the updating module 7221 according to a formula of $$I_{AM0} = I_{AM0} - \Delta I,$$

where $I_{AM0}$ represents the target operating current. Since the current correction ΔI is a value which is greater than or equal to zero, an updated target operating current $I_{AM0}$ is greater than the target operating current $I_{AM0}$ before updating. It should be noted that, if the number of effective shut-downs is greater than or equal to the first preset number, the target operating current $I_{AM0}$ of the inverter compressor Mc is too large, and thus it is necessary to decrease the target operating current $I_{AM0}$ of the inverter compressor Mc to take full advantage of the ability of the inverter compressor.

Further, in an embodiment of the present disclosure, when the inverter compressor Mc is shut down, the updated target operating current $I_{AM0}$ may be used as the target operating current $I_{AM0}$ of the inverter compressor Mc in a next starting up.

In summary, with the apparatus 210 for adjusting an operating frequency of an inverter compressor according to an embodiment of the present disclosure, if the inverter air conditioner is in the heating mode with no communication between the indoor machine and the outdoor machine, the operating frequency of the inverter compressor Mc may be adjusted intelligently and automatically according to the ability of the outdoor machine 2, the number of effective shut-downs and the maximum operating frequency Hzmax of the inverter compressor, which makes the ability of the inverter compressor Mc be played timely, and thus the preset temperature may be reached quickly.

With the apparatus for adjusting an operating frequency of an inverter compressor according to an embodiment of the present disclosure, when it is detected that the inverter air conditioner is in the heating mode by the detecting module, the operating frequency of the inverter compressor may be adjusted by the adjusting module according to the target operating current of the inverter compressor obtained by the first obtaining module, and when it is judged by the determining module that the number of effective shut-downs in the sixth preset time (T31) is greater than or equal to a first preset number, the current correction may be obtained by the updating module and the target operating current may be updated by the updating module according to the current correction, and thus an automatic adjustment of the operating frequency of the inverter compressor may be realized. In the case that the indoor machine and the outdoor machine do not communicate with each other, the apparatus for adjusting an operating frequency of an inverter compressor may automatically adjust the operating frequency of the inverter compressor by self-learning so as to enable the indoor ambient temperature to reach and maintain the preset temperature, such that the transmission process of the controlling parameters is cancelled, the structure of the inverter air conditioner becomes easier, the cost is greatly reduced and the reliability of the inverter air conditioner is improved.

Embodiment 4

In an embodiment of the present disclosure, according to the on-off signal and the mode selecting signal, the outdoor machine 2 may be controlled to start or shut down, or to select an operating mode. When it is detected that the inverter air conditioner is in the heating mode, the apparatus 210 for adjusting an operating frequency of an inverter compressor obtains the target operating current $I_{AM0}$ to adjust the operating frequency of the inverter compressor Mc according to the target operating current $I_{AM0}$, and when a continuous operating period of the inverter compressor Mc is greater than or equal to an eighth period (T42, for example A minutes), and a number of effective shut-downs in a seventh preset period (T41, for example B minutes) is greater than or equal to a second preset number, and the target operating current is greater than or equal to a preset current, a maximum operating frequency Hzmax of the inverter compressor Mc a ninth preset period (T43, for example X minutes) is obtained, and a current correction ΔI may be obtained according to the maximum operating frequency Hzmax, further the target operating current $I_{AM0}$ may be corrected according to the current correction ΔI to update the target operating current $I_{AM0}$, and finally the operating frequency of the inverter compressor Mc may be adjusted according to an updated target operating current $I_{AM0}$, thus realizing an automatic frequency control.

Specifically, when the inverter air conditioner is started for the first time, the apparatus 210 for adjusting an operating frequency of an inverter compressor may set the target operating current $I_{AM0}$ of the inverter compressor Mc to a preset current according to an ability of the outdoor machine 2, for example, for the outdoor machine 2 of a 3P air conditioner, the target operating current $I_{AM0}$ may be set to 10A, for the outdoor machine 2 of a 4P air conditioner, the target operating current $I_{AM0}$ may be set to 13A. Further, in an embodiment of the present disclosure, when the inverter compressor is shut down, the updated target operating current $I_{AM0}$ may be used as the target operating current $I_{AM0}$ of the outdoor machine 2 in a next starting up. Further, in an embodiment of the present disclosure, when the inverter compressor is operating, the apparatus 210 for adjusting an operating frequency of an inverter compressor may also obtain the target operating current $I_{AM0}$ according to the mode selecting signal.

Therefore, with the inverter air conditioner according to embodiments of the present disclosure, when the inverter air conditioner is in the heating mode with no communication between the indoor machine and the outdoor machine, the operating frequency of the inverter compressor Mc may be adjusted intelligently and automatically according to the ability of the outdoor machine 2, the continuous operating period, the number of effective shut-downs, the target operating current $I_{AM0}$ and the maximum operating frequency Hzmax of the inverter compressor, which makes the ability of the inverter compressor Mc to be played timely, thus ensuring that the indoor ambient temperature reaches a preset temperature quickly.

In an embodiment of the present disclosure, the inverter air conditioner may be a one-driven-one system or a one-driven-more system, and may be a cooling only air conditioner or a heat pump air conditioner. The indoor machine 1 cannot send an indoor ambient temperature and other parameters to the outdoor machine 2, and the outdoor machine 2 is controlled to start or shut down or change operation mode only according to the on-off signal and the mode selecting signal which are sent by the remote controller 101, the wired remote controller 102 or the indoor machine 1. The inverter air conditioner according to embodiments of the present disclosure can control the inverter compressor Mc in the heating mode with no communication between the indoor machine 1 and the outdoor machine 2, and the outdoor machine controlling unit 21 of the outdoor machine 2 may realize a control for the inverter compressor Mc and other electrical components of the outdoor machine 2 by self-learning, so that the indoor temperature may reach and maintain the preset temperature.

Further, in an embodiment of the present disclosure, when the outdoor machine controlling unit 21 receives the on-off signal, the outdoor machine controlling unit 21 further delays the on-off signal for a certain period (for example S seconds), so as to prevent the outdoor machine 2 from starting due to misuses of users, and to avoid misjudgment of the outdoor machine controlling unit 21. In other words, after the outdoor machine controlling unit 21 receives the on-off signal, a certain period may be delayed and then the outdoor machine 2 may be started or shut down.

With the inverter air conditioner according to embodiments of the present disclosure, the signal receiving terminal in the outdoor machine controlling unit receives the controlling signal from the signal sending terminal, and then the apparatus for adjusting an operating frequency of an inverter compressor in the outdoor machine controlling unit may adjust the operating frequency of the inverter compressor according to the controlling signal and the current which is detected by the current detecting unit, when the inverter air conditioner is in the heating mode with no communication between the indoor machine and the outdoor machine. By self-learning parameters of the inverter compressor, the operating frequency of the inverter compressor may be adjusted automatically and independently of the indoor machine, and thus the indoor ambient temperature may reach and maintain the preset temperature. During the adjusting process, the indoor machine and the outdoor machine do not need the specific communication to transmit the controlling parameters, so that the structure of the inverter air conditioner is simplified, the cost is greatly reduced, the transmission process of the controlling parameters is cancelled, and the reliability of the inverter air conditioners is improved.

A method for adjusting an operating frequency of an inverter compressor according to an embodiment of the present disclosure will be described with reference to drawings as follows.

Figure 10:
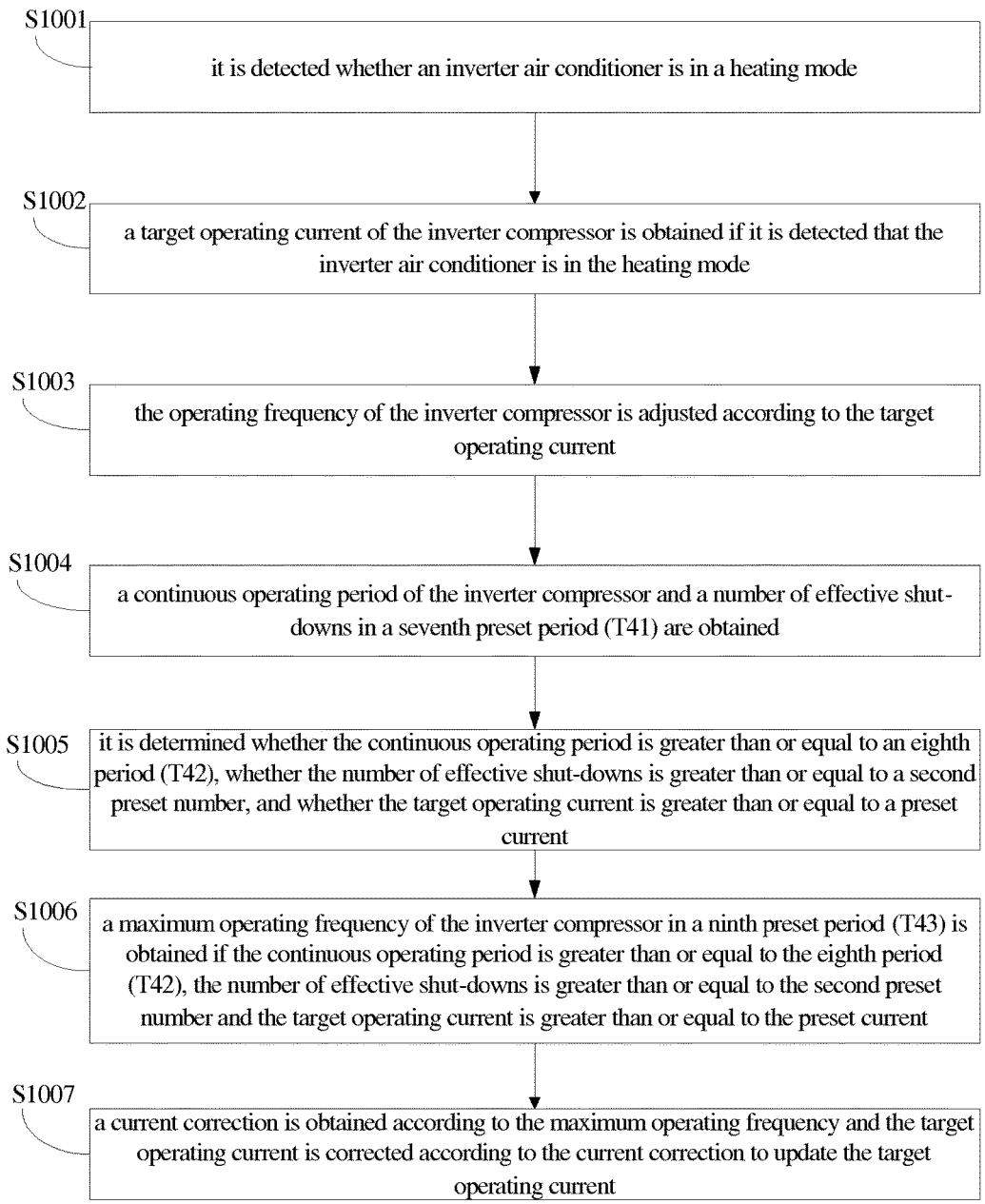
FIG. 10 is a flow chart showing a method for adjusting an operating frequency of an inverter compressor according to a fourth embodiment of the present disclosure.

FIG. 10 is a flow chart showing the method for adjusting an operating frequency of an inverter compressor according to an embodiment of the present disclosure. As shown in FIG. 10, the method for adjusting an operating frequency of an inverter compressor according to an embodiment of the present disclosure includes following steps.

At step S1001, it is detected whether an inverter air conditioner is in a heating mode.

At step S1002, a target operating current of the inverter compressor is obtained if it is detected that the inverter air conditioner is in the heating mode.

When the inverter air conditioner is started for the first time, the target operating current of the inverter compressor may be set to a preset current according to an ability of the outdoor machine, for example, for the outdoor machine of a 3P air conditioner, the target operating current may be set to 10A, and for the outdoor machine of a 4P air conditioner, the target operating current may be set to 13A. Further, in an embodiment of the present disclosure, when the inverter compressor is operating, the target operating current may also be obtained according to a mode selecting signal.

At step S1003, the operating frequency of the inverter compressor is adjusted according to the target operating current.

Step S1004 may be executed after the operating frequency of the inverter compressor is adjusted.

At step S1004, a continuous operating period of the inverter compressor and a number of effective shut-downs in a seventh preset period (T41) are obtained.

In an embodiment of the present disclosure, the effective shut-down is a shut-down occurring when the continuous operating period is greater than or equal to a tenth preset period (T44).

At step S1005, it is determined whether the continuous operating period is greater than or equal to an eighth period (T42), whether the number of effective shut-downs is greater than or equal to a second preset number, and whether the target operating current is greater than or equal to a preset current.

At step S1006, a maximum operating frequency of the inverter compressor in a ninth preset period (T43) is obtained if the continuous operating period is greater than or equal to the eighth period (T42), the number of effective shut-downs is greater than or equal to the second preset number and the target operating current is greater than or equal to the preset current.

After the maximum operating frequency of the inverter compressor in the ninth preset period (T43) is obtained, step S1007 is executed.

At step S 1007, a current correction is obtained according to the maximum operating frequency and the target operating current is corrected according to the current correction to update the target operating current.

In an embodiment of the present disclosure, the current correction is obtained according to a formula of $$\Delta I = A \times \text{Hzmax}^2 + B \times \text{Hzmax} + C,$$

where ΔI represents the current correction, Hzmax represents the maximum operating frequency, A, B and C represent preset constants respectively.

Further, in an embodiment of the present disclosure, the target operating current is updated according to a formula of $$I_{AM0}=I_{AM0}-\Delta I,$$

where $I_{AM0}$ represents the target operating current. Since the current correction is a value which is greater than or equal to zero, an updated target operating current is greater than the target operating current before updating. It should be noted that, if the continuous operating period is greater than or equal to an eighth period (T42) and the target operating current is greater than or equal to the preset current, the target operating current is too large, and thus it is necessary to decrease the target operating current of the inverter compressor to take full advantage of the ability of the inverter compressor.

Further, in an embodiment of the present disclosure, when the inverter compressor is shut down, the updated target operating current of the inverter compressor may be used as the target operating current of the inverter compressor in a next starting up.

Further, in an embodiment of the present disclosure, after step S1007, step S1008 may be further executed.

At step S1008, the continuous operating period is set to zero.

It should be noted that, in an embodiment of the present disclosure, step S1001 to step S1007 or step S1001 to step S1007 may be executed repeatedly. Thus, by setting the continuous operating period to zero, it may ensure that the continuous operating period obtained in a next operation cycle is started from zero, and thus the reliability of the method for adjusting an operating frequency of an inverter compressor according to an embodiment of the present disclosure may be ensured.

In summary, with the method for adjusting an operating frequency of an inverter compressor according to an embodiment of the present disclosure, if the inverter air conditioner is in the heating mode with no communication between the indoor machine and the outdoor machine, the operating frequency of the inverter compressor may be adjusted intelligently and automatically according to the ability of the outdoor machine, the continuous operating period, the number of effective shut-downs, the target operating current and the maximum operating frequency of the inverter compressor, which makes the ability of the inverter compressor be played timely, and thus the preset temperature may be reached quickly.

With the method for adjusting an operating frequency of an inverter compressor according to an embodiment of the present disclosure, when it is detected that the inverter air conditioner is in the heating mode, the operating frequency of the inverter compressor may be adjusted according to an obtained target operating current of the inverter compressor, and when it is judged that the continuous operating period is greater than or equal to the eighth period (T42), the number of effective shut-downs is greater than or equal to the second preset number and the target operating current is greater than or equal to the preset current, the current correction may be obtained according to an obtained maximum operating frequency, and the target operating current may be updated according to the current correction, and thus an automatic adjustment of the operating frequency of the inverter compressor may be realized. In the case that the indoor machine and the outdoor machine do not communicate with each other, the method for adjusting an operating frequency of an inverter compressor may automatically adjust the operating frequency of the inverter compressor by self-learning so as to enable the indoor machine to reach and maintain the preset temperature, such that the transmission process of the controlling parameters is reduced, and a high reliability is obtained.

An apparatus 210 for adjusting an operating frequency of an inverter compressor according to an embodiment of the present disclosure will be described with reference to drawings as follows.

Figure 11:
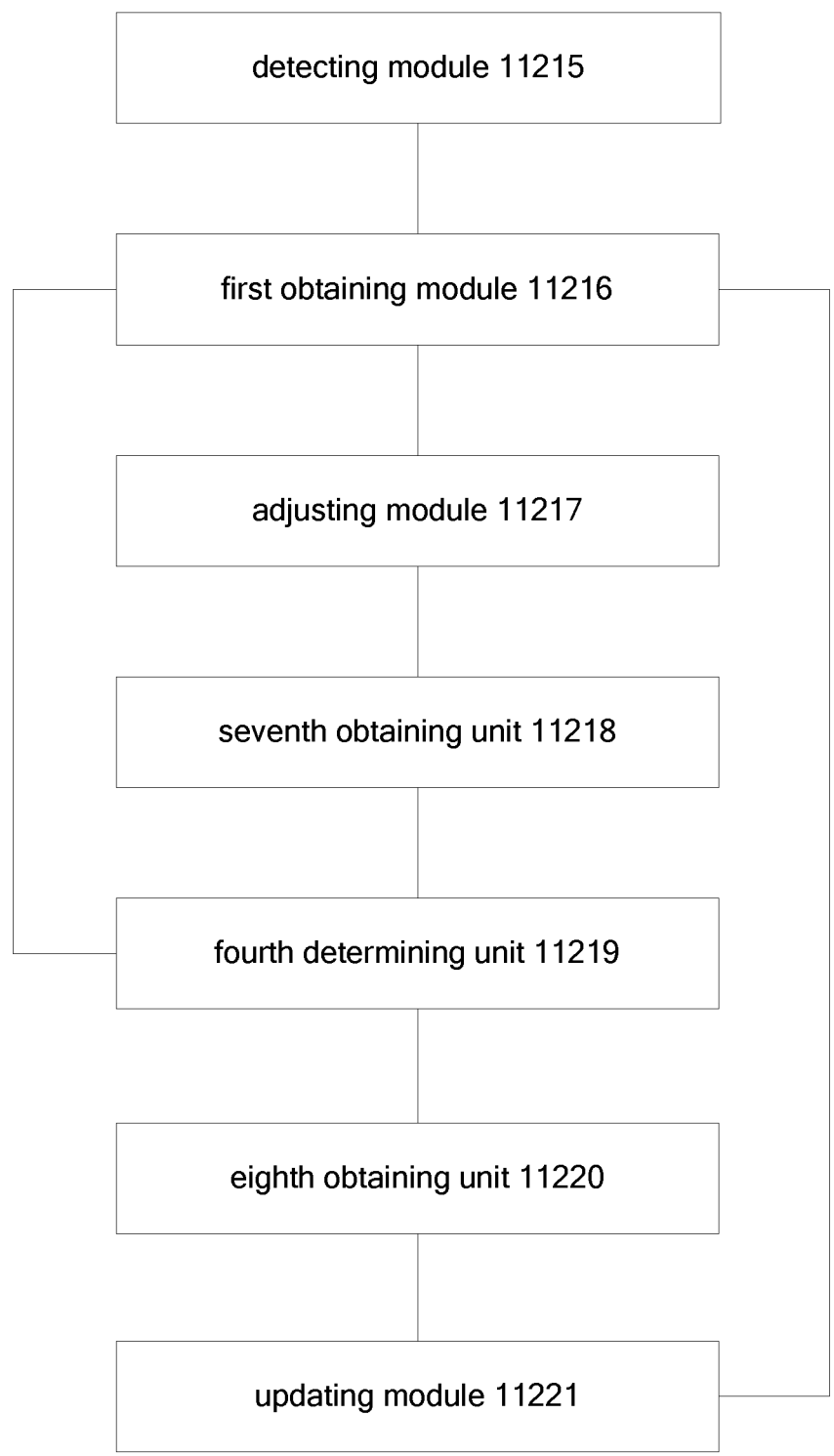
FIG. 11 is a block diagram illustrating an apparatus for adjusting an operating frequency of an inverter compressor according to a fourth embodiment of the present disclosure.

FIG. 11 is a block diagram illustrating the apparatus for adjusting an operating frequency of an inverter compressor according to an embodiment of the present disclosure. As shown in FIG. 11, the apparatus 210 for adjusting an operating frequency of an inverter compressor according to an embodiment of the present disclosure includes a detecting module 11215, a first obtaining module 11216, an adjusting module 11217, a second obtaining module (not shown) and an updating module 11221. The second obtaining module further includes a seventh obtaining unit 11218, a fourth determining unit 11219 and an eight obtaining unit 11220.

The detecting module 11215 is configured to detect whether an inverter air conditioner is in a heating mode. The first obtaining module 11216 is configured to obtain a target operating current $I_{AM0}$ of the inverter compressor Mc if the inverter air conditioner is in the heating mode. The adjusting module 11217 is configured to adjust the operating frequency of the inverter compressor Mc according to the target operating current $I_{AM0}$. The seventh obtaining unit 11218 is configured to obtain a continuous operating period of the inverter compressor and a number of effective shut-downs in a seventh preset period (T41, for example B minutes). The fourth determining unit 11219 is configured to determine whether the continuous operating period is greater than or equal to an eighth period (T42, for example A minutes), whether the number of effective shut-downs is greater than or equal to a second preset number, and whether the target operating current is greater than or equal to a preset current. The eighth obtaining unit 11220 is configured to obtain a maximum operating frequency Hzmax of the inverter compressor Mc in a ninth preset period (T43, for example X minutes), if the continuous operating period is greater than or equal to the eighth period (T42), the number of effective shut-downs is greater than or equal to the second preset number and the target operating current is greater than or equal to the preset current. The updating module 11221 is configured to obtain a current correction ΔI according to the maximum operating frequency Hzmax and to correct the target operating current $I_{AM0}$ according to the current correction ΔI to update the target operating current $I_{AM0}$.

Specifically, when the inverter air conditioner is started for the first time, the first obtaining module 11216 may set the target operating current $I_{AM0}$ of the inverter compressor Mc to a preset current according to an ability of the outdoor machine 2, for example, for the outdoor machine 2 of a 3P air conditioner, the target operating current may be set to 10A, and for the outdoor machine 2 of a 4P air conditioner, the target operating current may be set to 13A. Further, in an embodiment of the present disclosure, when the inverter compressor Mc is operating, the first obtaining module 11216 may obtain the target operating current $I_{AM0}$ according to a mode selecting signal.

In an embodiment of the present disclosure, the effective shut-down is a shut-down occurring when the continuous operating period is greater than or equal to a tenth preset period (T44).

Further, in an embodiment of the present disclosure, the current correction is obtained according to a formula of $$\Delta I = A \times \text{Hzmax}^2 + B \times \text{Hzmax} + C,$$

where $\Delta I$ represents the current correction, Hzmax represents the maximum operating frequency, A, B and C represent preset constants respectively.

Further, in an embodiment of the present disclosure, the target operating current is updated by the updating module 11221 according to a formula of $$I_{AM0} = I_{AM0} - \Delta I,$$

where $I_{AM0}$ represents the target operating current. Since the current correction $\Delta I$ is a value which is greater than or equal to zero, an updated target operating current $I_{AM0}$ is greater than the target operating current $I_{AM0}$ before updating. It should be noted that, if he continuous operating period is greater than or equal to the eighth period (T42), the number of effective shut-downs is greater than or equal to the second preset number and the target operating current is greater than or equal to the preset current, the target operating current $I_{AM0}$ of the inverter compressor Mc is too larger, and thus it is necessary to decrease the target operating current $I_{AM0}$ of the inverter compressor Mc to take full advantage of the ability of the inverter compressor.

Further, in an embodiment of the present disclosure, when the inverter compressor Mc is shut down, the updated target operating current $I_{AM0}$ may be used as the target operating current $I_{AM0}$ of the inverter compressor Mc in a next starting up.

Further, in an embodiment of the present disclosure, the apparatus 210 for adjusting an operating frequency of an inverter compressor further includes a setting module. The setting module is configured to set the continuous operating period to zero after the target operating current $I_{AM0}$ is updated by the updating module 11221. It should be noted that, in an embodiment of the present disclosure, the apparatus 210 for adjusting an operating frequency of an inverter compressor may operate repeatedly. Thus, by setting the continuous operating period to zero by the zero setting module, it may ensure that the continuous operating period obtained in a next operation cycle of the apparatus 210 for adjusting an operating frequency of an inverter compressor is started from zero, and thus the reliability of the apparatus 210 for adjusting an operating frequency of an inverter compressor according to an embodiment of the present disclosure may be ensured.

In summary, with the apparatus 210 for adjusting an operating frequency of an inverter compressor according to an embodiment of the present disclosure, if the inverter air conditioner is in the heating mode with no communication between the indoor machine and the outdoor machine, the operating frequency of the inverter compressor Mc may be adjusted intelligently and automatically according to the ability of the outdoor machine 2, the continuous operating period of the inverter compressor Mc, the number of effective shut-downs, the target operating current $I_{AM0}$ and the maximum operating frequency Hzmax of the inverter compressor, which makes the ability of the inverter compressor Mc be played timely, and thus the preset temperature may be reached quickly.

With the apparatus for adjusting an operating frequency of an inverter compressor according to an embodiment of the present disclosure, when it is detected that the inverter air conditioner is in the heating mode by the detecting module, the operating frequency of the inverter compressor may be adjusted by the adjusting module according to the target operating current of the inverter compressor obtained by the first obtaining module, and when it is determined by the determining module that the continuous operating period is greater than or equal to the eighth period (T42), the number of effective shut-downs is greater than or equal to the second preset number and the target operating current is greater than or equal to the preset current, the current correction may be obtained by the updating module according to the maximum operating frequency, and the target operating current may be updated by the updating module according to the current correction, and thus an automatic adjustment of the operating frequency of the inverter compressor may be realized. In the case that the indoor machine and the outdoor machine do not communicate with each other, the apparatus for adjusting an operating frequency of an inverter compressor may automatically adjust the operating frequency of the inverter compressor by self-learning to enable the indoor ambient temperature to reach and maintain the preset temperature, and thus the transmission process of the controlling parameters is cancelled, the structure of the inverter air conditioners is simplified, the cost is greatly reduced and the reliability of the inverter air conditioners is improved.

According to embodiments of the present disclosure, a non-transitory computer-readable storage medium is provided. The non-transitory computer-readable storage medium having stored therein instructions that, when executed by a processor of an inverter air conditioner, causes the inverter air conditioner to perform a method for adjusting an operating frequency of an inverter compressor according to the above-described embodiments.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for adjusting an operating frequency of an inverter compressor, comprising:
   detecting whether an inverter air conditioner comprising the inverter compressor is in a heating mode;
   obtaining a target operating current of the inverter compressor if the inverter air conditioner is in the heating mode;
   adjusting the operating frequency of the inverter compressor according to the target operating current;
   determining whether to adjust the target operating current based on an operating condition of the inverter compressor, and obtaining a maximum operating frequency of the inverter compressor in response to determining to adjust the target operating current;
   obtaining a current correction according to the maximum operating frequency and correcting the target operating current according to the current correction to update the target operating current.

2. The method according to claim 1, wherein determining whether to adjust the target operating current based on the operating condition of the inverter compressor, and obtaining the maximum operating frequency of the inverter compressor in response to determining to adjust the target operating current, comprises:
   obtaining a continuous operating period, a current operating frequency and a reference operating frequency of the inverter compressor, in which the reference operating frequency is an operating frequency at which the inverter compressor operates a first preset period earlier;
   determining whether the continuous operating period is greater than or equal to a second preset period and whether the current operating frequency is greater than or equal to the reference operating frequency; and
   if the continuous operating period is greater than or equal to the second preset period and the current operating frequency is greater than or equal to the reference operating frequency, obtaining a maximum operating frequency of the inverter compressor in a third preset period.

3. The method according to claim 1, wherein determining whether to adjust the target operating current based on the operating condition of the inverter compressor, and obtaining the maximum operating frequency of the inverter compressor in response to determining to adjust the target operating current, comprises:
   obtaining a continuous operating period and a current operating frequency of the inverter compressor;
   determining whether the continuous operating period is greater than or equal to a fourth preset period and whether the current operating frequency is greater than or equal to a preset frequency; and
   if the continuous operating period is greater than or equal to the fourth preset period and the current operating frequency is greater than or equal to the preset frequency, obtaining a maximum operating frequency of the inverter compressor in a fifth preset period.

4. The method according to claim 1, wherein determining whether to adjust the target operating current based on the operating condition of the inverter compressor, and obtaining the maximum operating frequency of the inverter compressor in response to determining to adjust the target operating current, comprises:
   obtaining a number of effective shut-downs of the inverter compressor in a sixth preset period;
   determining whether the number of effective shut-downs is greater than or equal to a first preset number; and
   if the number of effective shut-downs is greater than or equal to the first preset number, obtaining a maximum operating frequency of the inverter compressor in the sixth preset period.

5. The method according to claim 1, wherein determining whether to adjust the target operating current based on the operating condition of the inverter compressor, and obtaining the maximum operating frequency of the inverter compressor in response to determining to adjust the target operating current, comprises:
- obtaining a continuous operating period of the inverter compressor and a number of effective shut-downs in a seventh preset period;
- determining whether the continuous operating period is greater than or equal to an eighth period, whether the number of effective shut-downs is greater than or equal to a second preset number, and whether the target operating current is greater than or equal to a preset current;
- if the continuous operating period is greater than or equal to the eighth period, the number of effective shut-downs is greater than or equal to the second preset number and the target operating current is greater than or equal to the preset current, obtaining a maximum operating frequency of the inverter compressor in a ninth preset period.

6. The method according to claim 1, further comprising: setting a continuous operating period of the inverter compressor to zero after correcting the target operating current according to the current correction.

7. The method according to claim 5, wherein the effective shut-down is a shut-down occurring when the continuous operating period is greater than or equal to a tenth preset period.

8. The method according to claim 1, wherein the current correction is obtained according to a formula of $$\Delta I = A \times \text{Hzmax}^2 + B \times \text{Hzmax} + C,$$

where $\Delta I$ represents the current correction, Hzmax represents the maximum operating frequency, A, B and C represent preset constants respectively.

9. The method according to claim 8, wherein the target operating current is updated according to a formula of $$I_{Am0} = I_{Am0} - \Delta I,$$

where $I_{Am0}$ represents the target operating current.

10. An apparatus for adjusting an operating frequency of an inverter compressor, comprising:
- a detecting module, configured to detect whether an inverter air conditioner comprising the inverter compressor is in a heating mode;
- a first obtaining module, configured to obtain a target operating current of the inverter compressor when the inverter air conditioner is in the heating mode;
- an adjusting module, configured to adjust the operating frequency of the inverter compressor according to the target operating current;
- a second obtaining module, configured to determine whether to adjust the target operating current based on an operating condition of the inverter compressor, and to obtain a maximum operating frequency of the inverter compressor in response to determining to adjust the target operating current;
- an updating module, configured to obtain a current correction according to the maximum operating frequency and to correct the target operating current according to the current correction so as to update the target operating current.

11. The apparatus according to claim 10, wherein the second obtaining module comprises:
- a first obtaining unit, configured to obtain a continuous operating period, a current operating frequency and a reference operating frequency of the inverter compressor, in which the reference operating frequency is an operating frequency at which the inverter compressor operates a first preset period earlier;
- a first determining unit, configured to determine whether the continuous operating period is greater than or equal to a second preset period and whether the current operating frequency is greater than or equal to the reference operating frequency;
- a second obtaining unit, configured to obtain a maximum operating frequency of the inverter compressor in a third preset period when the continuous operating period is greater than or equal to the second preset period and the current operating frequency is greater than or equal to the reference operating frequency.

12. The apparatus according to claim 10, wherein the second obtaining module comprises:
- a third obtaining unit, configured to obtain a continuous operating period and a current operating frequency of the inverter compressor;
- a second determining unit, configured to determine whether the continuous operating period is greater than or equal to a fourth preset period and whether the current operating frequency is greater than or equal to a preset frequency;
- a fourth obtaining unit, configured to obtain a maximum operating frequency of the inverter compressor in a fifth preset period when the continuous operating period is greater than or equal to the fourth preset period and the current operating frequency is greater than or equal to the preset frequency.

13. The apparatus according to claim 10, wherein the second obtaining module comprises:
- a fifth obtaining unit, configured to obtain a number of effective shut-downs of the inverter compressor in a sixth preset period;
- a third determining unit, configured to determine whether the number of effective shut-downs is greater than or equal to a first preset number;
- a sixth obtaining unit, configured to obtain a maximum operating frequency of the inverter compressor in the sixth preset period when the number of effective shut-downs is greater than or equal to the first preset number.

14. The apparatus according to claim 10, wherein the second obtaining module comprises:
- a seventh obtaining unit, configured to obtain a continuous operating period of the inverter compressor and a number of effective shut-downs in a seventh preset period;
- a fourth determining unit, configured to determine whether the continuous operating period is greater than or equal to an eighth period, whether the number of effective shut-downs is greater than or equal to a second preset number, and whether the target operating current is greater than or equal to a preset current;
- an eighth obtaining unit, configured to obtain a maximum operating frequency of the inverter compressor in a ninth preset period when the continuous operating period is greater than or equal to the eighth period, the number of effective shut-downs is greater than or equal to the second preset number and the target operating current is greater than or equal to the preset current.

15. The apparatus according to claim 10, further comprising:

a setting module, configured to set a continuous operating period of the inverter compressor to zero after the target operating current is updated.

16. The apparatus according to claim 14, wherein the effective shut-down is a shut-down occurring when the continuous operating period is greater than or equal to a tenth preset period.

17. The apparatus according to claim 10, wherein the current correction is obtained according to a formula of $$\Delta I = A \times \text{Hzmax}^2 + B \times \text{Hzmax} + C,$$

where $\Delta I$ represents the current correction, Hzmax represents the maximum operating frequency, A, B and C represent preset constants respectively.

18. The apparatus according to claim 17, wherein the target operating current is updated according to a formula of $$I_{Am0} = I_{Am0} - \Delta I,$$

where $I_{Am0}$ represents the target operating current.

19. An inverter air conditioner, comprising:
- a signal sending terminal, configured to send a controlling signal;
- an inverter compressor;
- a current detecting unit, connected with the inverter compressor and configured to detect a present current of the inverter compressor; and
- an outdoor machine controlling unit, comprising an apparatus for adjusting an operating frequency of the inverter compressor and a signal receiving terminal, wherein the signal receiving terminal is configured to receive the controlling signal for controlling the inverter air conditioner to start, shut down or enter different operating modes, and the apparatus for adjusting an operating frequency of the inverter compressor is configured to:
- detect whether the inverter air conditioner is in a heating mode;
- obtain a target operating current of the inverter compressor if the inverter air conditioner is in the heating mode;
- adjust the operating frequency of the inverter compressor according to the target operating current and the present current;
- determine whether to adjust the target operating current based on an operating condition of the inverter compressor, and to obtain a maximum operating frequency of the inverter compressor in response to determining to adjust the target operating current;
- obtain a current correction according to the maximum operating frequency and correct the target operating current according to the current correction to update the target operating current.

20. A non-transitory computer-readable storage medium having stored therein instructions that, when executed by a processor of an inverter air conditioner, causes the inverter air conditioner to perform a method for adjusting an operating frequency of an inverter compressor, the method comprising:
- detecting whether the inverter air conditioner is in a heating mode;
- obtaining a target operating current of the inverter compressor if the inverter air conditioner is in the heating mode;
- adjusting the operating frequency of the inverter compressor according to the target operating current;
- determining whether to adjust the target operating current based on an operating condition of the inverter compressor, and obtaining a maximum operating frequency of the inverter compressor in response to determining to adjust the target operating current; and
- obtaining a current correction according to the maximum operating frequency and correcting the target operating current according to the current correction to update the target operating current.

* * * * *